(12) United States Patent
Khemani et al.

(10) Patent No.: US 7,853,678 B2
(45) Date of Patent: *Dec. 14, 2010

(54) SYSTEMS AND METHODS FOR CONFIGURING FLOW CONTROL OF POLICY EXPRESSIONS

(75) Inventors: Prakash Khemani, San Jose, CA (US); Vishal Bandekar, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 671 days.

This patent is subject to a terminal disclaimer.

(21) Appl. No.: 11/685,171

(22) Filed: Mar. 12, 2007

(65) Prior Publication Data

US 2008/0225720 A1 Sep. 18, 2008

(51) Int. Cl.
*G06F 15/173* (2006.01)
(52) U.S. Cl. ...................... 709/223; 709/224
(58) Field of Classification Search ................ 709/223, 709/224; 370/235
See application file for complete search history.

(56) References Cited

U.S. PATENT DOCUMENTS

| | | | |
|---|---|---|---|
| 5,057,996 | A | 10/1991 | Cutler et al. |
| 5,187,790 | A | 2/1993 | East et al. |
| 5,204,897 | A | 4/1993 | Wyman |
| 5,297,283 | A | 3/1994 | Kelly, Jr. et al. |
| 5,426,637 | A | 6/1995 | Derby et al. |
| 5,729,710 | A | 3/1998 | Magee et al. |
| 5,872,973 | A | 2/1999 | Mitchell et al. |
| 5,911,051 | A | 6/1999 | Carson et al. |
| 6,158,007 | A | 12/2000 | Moreh et al. |

(Continued)

FOREIGN PATENT DOCUMENTS

WO  WO-0223362 A1  3/2002

(Continued)

OTHER PUBLICATIONS

European Examination Report, dated Feb. 1, 2010, for E.P. Patent Application No. 08732008.1, 5 pages.

(Continued)

*Primary Examiner*—Krisna Lim
(74) *Attorney, Agent, or Firm*—Choate, Hall & Stewart LLP; Christopher J. McKenna

(57) ABSTRACT

Systems and methods for configuring and evaluating policies that direct processing of one or more data streams are described. A configuration interface is described for allowing users to specify object oriented policies. These object oriented policies may allow any data structures to be applied with respect to a payload of a received packet stream, including any portions of HTTP traffic. A configuration interface may also allow the user to control the order in which policies and policy groups are executed, in addition to specifying actions to be taken if one or more policies are undefined. Systems and methods for processing the policies may allow efficient processing of object-oriented policies by applying potentially complex data structures to unstructured data streams. A device may also interpret and process a number of flow control commands and policy group invocation statements to determine an order of execution among a number of policies and policy groups. These policy configurations and processing may allow configuration and processing of complex network behaviors relating to load balancing, VPNs, SSL offloading, content switching, application security, acceleration, and caching.

38 Claims, 27 Drawing Sheets

U.S. PATENT DOCUMENTS

| | | |
|---|---|---|
| 6,169,992 B1 | 1/2001 | Beall et al. |
| 6,202,096 B1 | 3/2001 | Williams et al. |
| 6,289,382 B1 | 9/2001 | Bowman-Amuah |
| 6,321,337 B1 | 11/2001 | Reshef et al. |
| 6,332,163 B1 | 12/2001 | Bowman-Amuah |
| 6,333,931 B1 | 12/2001 | LaPier et al. |
| 6,339,595 B1 | 1/2002 | Rekhter et al. |
| 6,339,832 B1 | 1/2002 | Bowman-Amuah |
| 6,412,000 B1 | 6/2002 | Riddle et al. |
| 6,427,063 B1 | 7/2002 | Cook et al. |
| 6,427,234 B1 | 7/2002 | Chambers et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,452,915 B1 | 9/2002 | Jorgensen |
| 6,463,470 B1 | 10/2002 | Mohaban et al. |
| 6,466,654 B1 | 10/2002 | Cooper et al. |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,102 B1 | 12/2002 | Haswell et al. |
| 6,502,131 B1 | 12/2002 | Vaid et al. |
| 6,502,213 B1 | 12/2002 | Bowman-Amuah |
| 6,519,571 B1 | 2/2003 | Guheen et al. |
| 6,523,027 B1 | 2/2003 | Underwood |
| 6,526,056 B1 | 2/2003 | Rekhter et al. |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,584,569 B2 | 6/2003 | Reshef et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,479 B2 | 8/2003 | Cook et al. |
| 6,606,660 B1 | 8/2003 | Bowman-Amuah |
| 6,609,128 B1 | 8/2003 | Underwood |
| 6,611,822 B1 | 8/2003 | Beams et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,629,081 B1 | 9/2003 | Cornelius et al. |
| 6,633,878 B1 | 10/2003 | Underwood |
| 6,636,242 B2 | 10/2003 | Bowman-Amuah |
| 6,640,145 B2 | 10/2003 | Hoffberg et al. |
| 6,640,238 B1 | 10/2003 | Bowman-Amuah |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,657,954 B1 | 12/2003 | Bird et al. |
| 6,691,301 B2 | 2/2004 | Bowen et al. |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,380 B1 | 4/2004 | Mohaban et al. |
| 6,718,535 B1 | 4/2004 | Underwood |
| 6,721,286 B1 | 4/2004 | Williams et al. |
| 6,721,713 B1 | 4/2004 | Guheen et al. |
| 6,742,015 B1 | 5/2004 | Bowman-Amuah |
| 6,757,362 B1 | 6/2004 | Cooper et al. |
| 6,842,906 B1 | 1/2005 | Bowman-Amuah |
| 6,850,252 B1 | 2/2005 | Hoffberg |
| 6,877,043 B2 | 4/2005 | Mallory et al. |
| 6,882,634 B2 | 4/2005 | Bagchi et al. |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,904,449 B1 | 6/2005 | Quinones |
| 6,907,546 B1 | 6/2005 | Haswell et al. |
| 6,950,818 B2 * | 9/2005 | Dennis et al. .................. 707/3 |
| 6,954,736 B2 | 10/2005 | Menninger et al. |
| 6,954,800 B2 | 10/2005 | Mallory |
| 6,957,186 B1 | 10/2005 | Guheen et al. |
| 6,975,655 B2 | 12/2005 | Fischer et al. |
| 6,976,090 B2 | 12/2005 | Ben-Shaul et al. |
| 6,988,236 B2 | 1/2006 | Ptasinski et al. |
| 6,993,101 B2 | 1/2006 | Trachewsky et al. |
| 7,000,031 B2 | 2/2006 | Fischer et al. |
| 7,027,055 B2 | 4/2006 | Anderson et al. |
| 7,035,285 B2 | 4/2006 | Holloway et al. |
| 7,039,606 B2 | 5/2006 | Hoffman et al. |
| 7,047,279 B1 | 5/2006 | Beams et al. |
| 7,054,837 B2 | 5/2006 | Hoffman et al. |
| 7,054,944 B2 | 5/2006 | Tang et al. |
| 7,069,234 B1 | 6/2006 | Cornelius et al. |
| 7,072,807 B2 | 7/2006 | Brown et al. |
| 7,072,843 B2 | 7/2006 | Menninger et al. |
| 7,082,572 B2 | 7/2006 | Pea et al. |
| 7,085,683 B2 | 8/2006 | Anderson et al. |
| 7,100,195 B1 | 8/2006 | Underwood |
| 7,120,596 B2 | 10/2006 | Hoffman et al. |
| 7,136,645 B2 | 11/2006 | Hanson et al. |
| 7,140,044 B2 | 11/2006 | Redlich et al. |
| 7,143,153 B1 | 11/2006 | Black et al. |
| 7,146,644 B2 | 12/2006 | Redlich et al. |
| 7,149,698 B2 | 12/2006 | Guheen et al. |
| 7,152,092 B2 | 12/2006 | Beams et al. |
| 7,162,509 B2 | 1/2007 | Brown et al. |
| 7,165,041 B1 | 1/2007 | Guheen et al. |
| 7,167,844 B1 | 1/2007 | Leong et al. |
| 7,171,379 B2 | 1/2007 | Menninger et al. |
| 7,191,252 B2 | 3/2007 | Redlich et al. |
| 7,194,763 B2 | 3/2007 | Potter et al. |
| 7,200,530 B2 | 4/2007 | Brown et al. |
| 7,206,805 B1 | 4/2007 | McLaughlin, Jr. |
| 7,228,453 B2 * | 6/2007 | O'Brien et al. ............... 714/13 |
| 7,237,265 B2 | 6/2007 | Reshef et al. |
| 7,310,721 B2 | 12/2007 | Cohen |
| 7,318,100 B2 | 1/2008 | Demmer et al. |
| 7,385,924 B1 * | 6/2008 | Riddle ....................... 370/235 |
| 7,389,462 B1 | 6/2008 | Wang et al. |
| 7,522,581 B2 | 4/2009 | Acharya et al. |
| 2002/0010855 A1 | 1/2002 | Reshef et al. |
| 2002/0016851 A1 | 2/2002 | Border |
| 2002/0034173 A1 | 3/2002 | Border et al. |
| 2002/0098840 A1 | 7/2002 | Hanson et al. |
| 2002/0105972 A1 | 8/2002 | Richter et al. |
| 2002/0150048 A1 | 10/2002 | Ha et al. |
| 2003/0014442 A1 | 1/2003 | Shiigi et al. |
| 2003/0067874 A1 | 4/2003 | See et al. |
| 2003/0074436 A1 * | 4/2003 | Gieseke ..................... 709/223 |
| 2003/0084165 A1 | 5/2003 | Kjellberg et al. |
| 2003/0110192 A1 | 6/2003 | Valente et al. |
| 2003/0115204 A1 | 6/2003 | Greenblatt et al. |
| 2003/0223361 A1 | 12/2003 | Hussain et al. |
| 2003/0233581 A1 | 12/2003 | Reshef et al. |
| 2003/0236887 A1 | 12/2003 | Kesselman et al. |
| 2004/0039827 A1 | 2/2004 | Thomas et al. |
| 2004/0073512 A1 | 4/2004 | Maung |
| 2004/0073701 A1 | 4/2004 | Huang et al. |
| 2004/0107360 A1 | 6/2004 | Herrmann et al. |
| 2004/0210320 A1 | 10/2004 | Pandya |
| 2005/0004887 A1 | 1/2005 | Igakura et al. |
| 2005/0015624 A1 | 1/2005 | Ginter et al. |
| 2005/0021723 A1 * | 1/2005 | Saperia ...................... 709/223 |
| 2005/0044089 A1 | 2/2005 | Wu et al. |
| 2005/0044108 A1 | 2/2005 | Shah et al. |
| 2005/0050053 A1 | 3/2005 | Thompson |

| | | |
|---|---|---|
| 2005/0063083 A1 | 3/2005 | Dart et al. |
| 2005/0071650 A1 | 3/2005 | Jo et al. |
| 2005/0091655 A1 | 4/2005 | Probert et al. |
| 2006/0026682 A1 | 2/2006 | Zakas |
| 2006/0095689 A1 | 5/2006 | Peinado et al. |
| 2006/0117169 A1 | 6/2006 | Peinado et al. |
| 2006/0221990 A1 | 10/2006 | Muller et al. |
| 2006/0294219 A1 | 12/2006 | Ogawa et al. |
| 2007/0002769 A1 | 1/2007 | Matityahu et al. |
| 2007/0016597 A1 * | 1/2007 | Beadles et al. ............. 707/100 |
| 2007/0067366 A1 | 3/2007 | Landis |
| 2007/0169179 A1 | 7/2007 | Narad |
| 2007/0179955 A1 | 8/2007 | Croft et al. |
| 2007/0268516 A1 * | 11/2007 | Bugwadia et al. .......... 358/1.15 |
| 2007/0280232 A1 * | 12/2007 | Dec et al. .................. 370/390 |
| 2007/0283005 A1 * | 12/2007 | Beliles et al. ............... 709/224 |
| 2007/0297378 A1 * | 12/2007 | Poyhonen et al. .......... 370/338 |
| 2007/0300185 A1 | 12/2007 | Macbeth et al. |
| 2008/0034425 A1 | 2/2008 | Overcash et al. |
| 2008/0046616 A1 | 2/2008 | Verzunov et al. |
| 2008/0049786 A1 | 2/2008 | Ram et al. |
| 2008/0225748 A1 | 9/2008 | Khemani et al. |
| 2008/0225753 A1 * | 9/2008 | Khemani et al. ........... 370/255 |
| 2008/0229381 A1 | 9/2008 | Sikka et al. |
| 2008/0320151 A1 | 12/2008 | McCanne et al. |

FOREIGN PATENT DOCUMENTS

| | | |
|---|---|---|
| WO | WO-0239260 A2 | 5/2002 |
| WO | WO-2004/114529 A2 | 12/2004 |
| WO | WO-2005024550 A2 | 3/2005 |
| WO | WO-2005024665 A1 | 3/2005 |
| WO | WO-2005029313 A1 | 3/2005 |
| WO | WO-2005029363 A1 | 3/2005 |
| WO | WO-2007/024647 A2 | 3/2007 |

OTHER PUBLICATIONS

Frahim, J. & Santos, O., *Cisco ASA: All-in-One Firewall, IPS, and VPN Adaptive Security Appliance*, Cisco Press. (2005).

U.S. Final Office Action, dated Jun. 11, 2010, in U.S. Appl. No. 11/685,147, 6 pages.

U.S. Final Office Action, dated Jun. 14, 2010, in U.S. Appl. No. 11/685,175, 6 pages.

U.S. Final Office Action, dated May 26, 2010, in U.S. Appl. No. 11/685,177, 18 pages.

Written Opinion of the International Searching Authority, PCT/US2008/056671, mailed on Sep. 12, 2009.

International Search Report, PCT/US2008/056671, mailed on Mar. 12, 2009.

U.S. Non-Final Office Action, dated Dec. 17, 2009, in U.S. Appl. No. 11/685,147.

U.S. Non-Final Office Action, dated Jun. 12, 2009, in U.S. Appl. No. 11/685,167.

U.S. Non-Final Office Action, dated Mar. 18, 2010, in U.S. Appl. No. 11/685,167.

U.S. Non-Final Office Action, dated Sep. 4, 2009, in U.S. Appl. No. 11/685,180.

U.S. Final Office Action, dated Mar. 3, 2010, in U.S. Appl. No. 11/685,180.

U.S. Non-Final Office Action, dated Dec. 15, 2009, in U.S. Appl. No. 11/685,175.

U.S. Non-Final Office Action, dated Dec. 1, 2009, in U.S. Appl. No. 11/685,177.

* cited by examiner

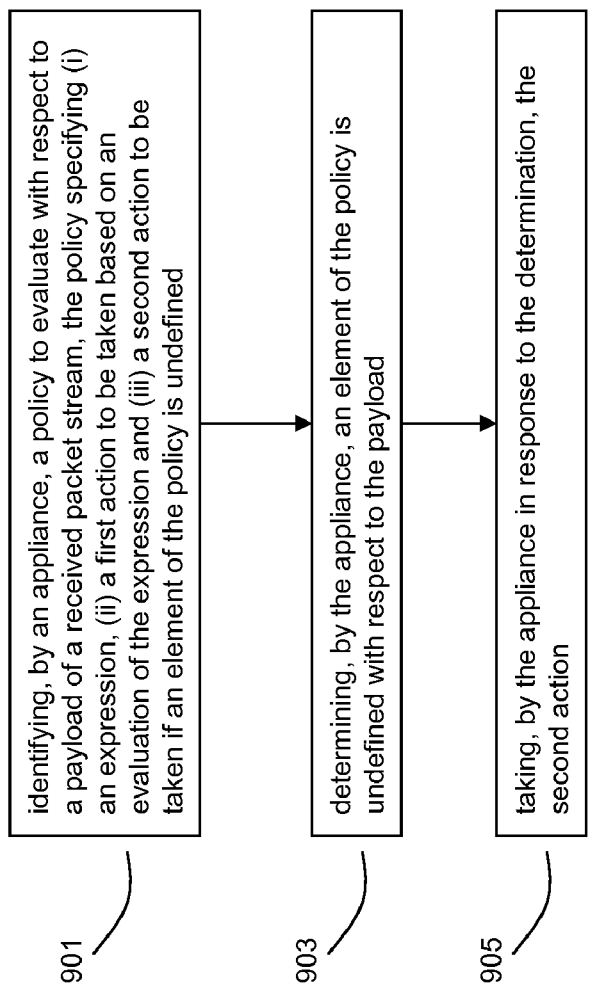

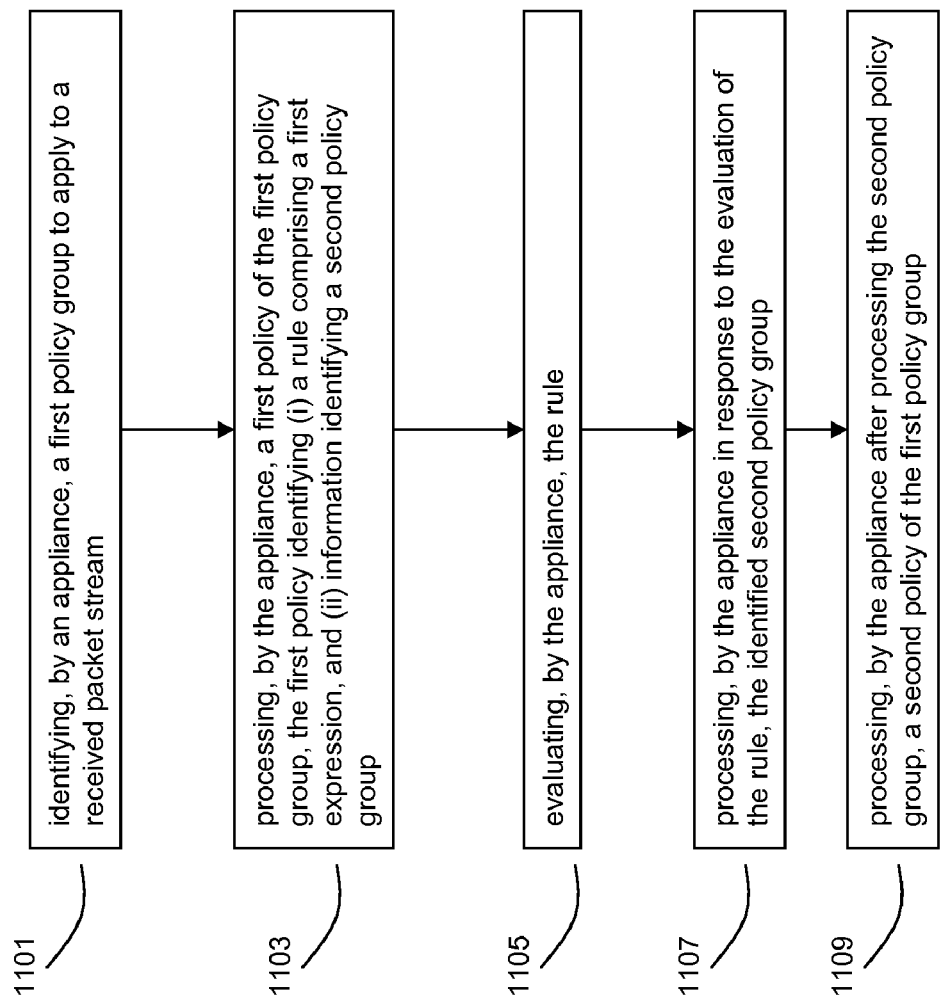

SYSTEMS AND METHODS FOR CONFIGURING FLOW CONTROL OF POLICY EXPRESSIONS

FIELD OF THE INVENTION

The present invention relates to computer networking technologies. Specifically, the present invention relates to systems and methods for configuring and applying policies and settings in network devices.

BACKGROUND OF THE INVENTION

Network devices and clients may provide a number of complex functions with respect to network traffic. Among other functions, network devices may provide load balancing, application security, content switching, SSL offloading, acceleration, and caching. However, as the number and complexity of the functions provided by network devices grows, the complexity and amount of configuration required for a network device may similarly increase. Further, improper or suboptimal configuration of a network device may result in decreased performance, network errors, application incompatibility, and weakened security.

Many network devices may utilize a policy framework to control network device functions. In these frameworks, a policy may specify a rule and an action which dictates a behavior under certain conditions. For example, with HTTP traffic, a policy framework may allow a user to configure device behavior based on content within the HTTP stream. These policies may become complex depending on the content to be analyzed and the behaviors sought. Thus, there exists a need for a policy framework which allows a user to apply structure to network traffic for the purpose of writing policies to direct device behavior. There similarly exists a need for a network device which can then implement such structured policy expressions in an efficient manner.

In addition, as the number and complexity of network device functions grow, the number of policies required for their configuration may also grow. With an increase in the number of policies, there also exists a need for specifying and implementing processing orders among policies and groups of policies.

Further, some desirable policies used in network devices may not always have defined results. For example, a policy may specify behavior in response to a given field of an HTTP request, but may be undefined in cases where the field is not present or the field has an unexpected value. While it may be possible in some cases to write policies that are always defined, this may require additional policies or more complex policies and may increase administrative overhead. Thus, there exists a need for configuration systems which allow a user to specify one or more actions for the case in which a policy is undefined.

BRIEF SUMMARY OF THE INVENTION

The present invention is directed towards systems and methods for configuring and evaluating policies that direct processing of one or more data streams. A configuration interface is described for allowing users to specify object oriented policies. These object oriented policies may allow any data structures to be applied with respect to a payload of a received packet stream, including any portions of HTTP traffic. A configuration interface may also allow the user to control the order in which policies and policy groups are executed, in addition to specifying actions to be taken if one or more policies are undefined. Systems and methods for processing the policies may allow efficient processing of object-oriented policies by applying potentially complex data structures to unstructured data streams. A device may also interpret and process a number of flow control commands and policy group invocation statements to determine an order of execution among a number of policies and policy groups. These policy configurations and processing may allow a user to efficiently configure complex network behaviors relating to load balancing, VPNs, SSL offloading, content switching, application security, acceleration, and caching.

In one aspect, the present invention relates to systems and methods of configuring a policy of a network device with an object-oriented expression to specify structure in a payload of a packet stream received by a network device In one embodiment, the method comprises: providing a configuration interface for configuring a policy for a network device; receiving, via the configuration interface, an expression for the policy, the expression identifying (i) an object class to apply to a portion of the payload of a packet stream, and (ii) a member of the object class; and receiving, via the configuration interface, information identifying an action for the policy, the action to be taken based on an evaluation of the expression.

In a second aspect, the present invention relates to systems and methods for applying object-oriented expressions in a policy to specify structure in a payload of a packet stream received by the appliance. In one embodiment, a method comprises: identifying, by an appliance, a policy to evaluate with respect to a payload of a received packet stream, the policy specifying (i) an object class to apply to a portion of the payload of a packet stream, (ii) a member of the object class and (iii) an action; selecting, by the appliance, a portion of the payload identified by the object class; determining, by the appliance, a value for the member of the object class; and taking, in response to the determined value, the action. In another embodiment, a method comprises: identifying, by an appliance, a policy comprising an object-oriented expression to evaluate with respect to a payload of a received packet stream; assigning, by the appliance, values to a data structure specified by the object-oriented expression based on a portion of the payload; performing, by the appliance, an evaluation of the expression based on the assigned values; and taking, in response to the evaluation, an action specified by the policy. Corresponding systems may include a packet processor for receiving packet streams and a policy engine for evaluating one or more object-oriented policies and taking associated actions.

In a third aspect, the present invention relates to systems and methods for applying object-oriented expressions in a policy to specify structure in a payload of a packet stream received by the appliance. In one embodiment, a method comprises: identifying, by an appliance, a policy comprising an object-oriented expression to evaluate with respect to a payload of a received packet stream; assigning, by the appliance, values to a data structure specified by the object-oriented expression based on a portion of the payload; performing, by the appliance, an evaluation of the expression based on the assigned values; altering, in response to the evaluation, a portion of the received packet stream; and transmitting, by the appliance, the altered packet stream. Corresponding systems may include a packet processor for receiving and forwarding the packet stream and a policy engine for evaluating one or more object-oriented policies and taking associated actions.

In a fourth aspect the present invention relates to systems and methods for configuring and/or processing a policy used by a network device by specifying an action to be taken in the event an element of the policy is undefined. In one embodiment, a method comprises: providing a configuration interface for configuring a policy of a network device; identifying, by the configuration interface, a policy comprising a first action to be taken based on an evaluation of an expression; receiving, via the configuration interface, information identifying a second action for the policy, the second action to be taken if an element of the policy is undefined. In another embodiment, a method of applying a policy specifying an action to be taken in the event an element of the policy is undefined comprises: identifying, by an appliance, a policy to evaluate with respect to a payload of a received packet stream, the policy specifying (i) an expression, (ii) a first action to be taken based on an evaluation of the expression and (iii) a second action to be taken if an element of the policy is undefined; determining, by the appliance, an element of the policy is undefined with respect to the payload; and taking, by the appliance in response to the determination, the second action. Corresponding systems may include a packet processor for receiving a packet stream, and a policy engine for evaluating one or more policies and taking associated actions.

In a fifth aspect, the present invention relates to systems and methods for configuring and/or processing flow control among policies used in processing a packet stream. In one embodiment, a method comprises: providing a configuration interface for configuring a plurality of policies of a network device, at least one policy of the plurality of policies comprising a policy identifier; and receiving, via the configuration interface, information identifying a first policy of the plurality of policies, the first policy identifying (i) a rule comprising a first expression and (ii) a first action to be taken based on an evaluation of the rule; and receiving, via the configuration interface, information identifying a second policy of the plurality of policies to apply subsequent to the first policy if the rule evaluates to true. In another embodiment, a method includes: identifying, by an appliance, a plurality of policies to apply to a received packet stream, at least one policy of the plurality of policies comprising a policy identifier; processing, by the appliance, a first policy of the plurality of policies, the first policy identifying (i) a rule comprising a first expression and (ii) a first action to be taken based on an evaluation of the rule, and (iii) a second policy of the plurality of policies; determining, by the appliance based on an evaluation of the expression, the rule evaluates to true; and processing, by the appliance in response to the determination, the identified second policy. Corresponding systems may include a packet processor for receiving a packet stream, and a policy engine for evaluating one or more policies and taking associated actions.

In a sixth aspect, the present invention relates to systems and methods for configuring and/or processing flow control among policy groups used in a network device processing a packet stream. In one embodiment, a method comprises: providing a configuration interface for configuring a plurality of policy groups for a network device; identifying, by the configuration interface, a first policy of a first policy group, the first policy specifying a rule comprising a first expression; and receiving, via the interface, information identifying a second policy group to be processed based on an evaluation of the rule. In another embodiment, a method comprises: identifying, by an appliance, a first policy group to apply to a received packet stream; processing, by the appliance, a first policy of the first policy group, the first policy identifying (i) a rule comprising a first expression, and (ii) information identifying a second policy group; evaluating, by the appliance, the rule; and processing, by the appliance in response to the evaluation of the rule, the identified second policy group. Corresponding systems may include a packet processor for receiving a packet stream and a policy engine for evaluating one or more policies and taking associated actions.

In a seventh aspect, the present invention relates to systems and methods for configuring and/or processing one or more application security profiles for a device, each application security profile specifying a number of checks performing security functions related to an application. In one embodiment, a method comprises: providing a configuration interface for configuring an application security profile; receiving, via the configuration interface, a first setting, the setting specifying corresponding to a first check of the application security profile; receiving, via the configuration interface, a second setting, the second setting specifying corresponding to a second check of the application security profile; identifying, by the configuration interface, a policy, the policy specifying a rule comprising a first expression; and receiving, via the interface, information identifying the application security profile to be processed based on an evaluation of the rule. In another embodiment, a method may comprise identifying, by an appliance, a first policy to apply to a received packet stream; the first policy specifying a rule comprising a first expression and identifying an application security profile; evaluating, by the appliance, the rule; processing, by the appliance in response to the evaluation of the rule, a first check specified by the application security profile; and processing, by the appliance in response to the evaluation of the rule, a second check specified by the application security profile. Corresponding systems may include a packet processor for receiving a packet stream and a policy engine for evaluating one or more application security profiles and taking associated actions.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 9 is a flow diagram of one embodiment of a method for handling undefined policy elements;

FIG. 11B is a block diagram of one embodiment of a method of controlling processing order among a plurality of policy groups;

Figure 1A:
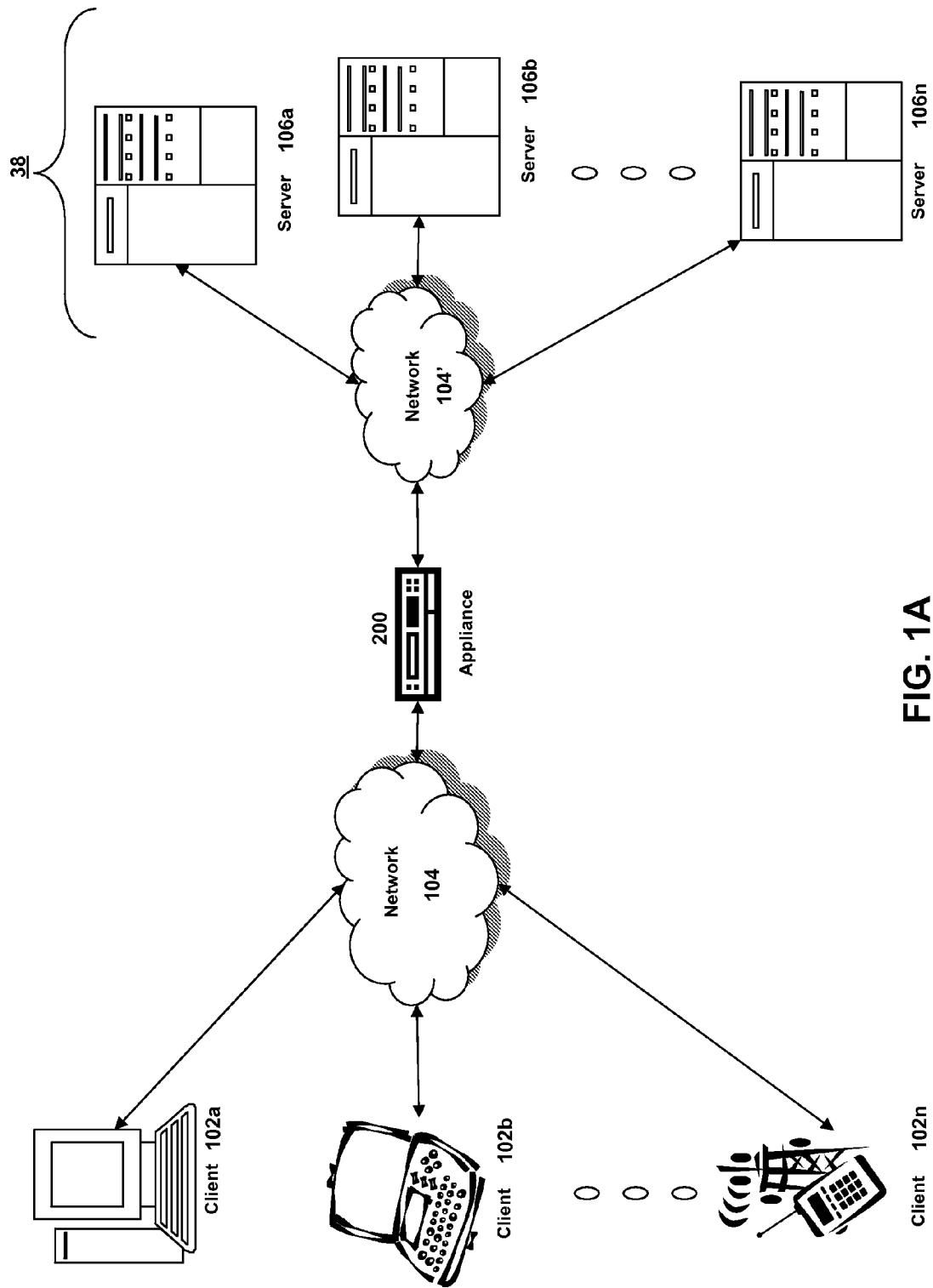
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server;

Section D describes embodiments of systems and methods for configuring and using object-oriented policy expressions;

Section E describes embodiments of systems and methods for handling undefined policy expressions;

Section F describes embodiments of systems and methods for configuring and using policy groups; and Section G describes embodiments of systems and methods for configuring and using application security profiles.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102.

One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
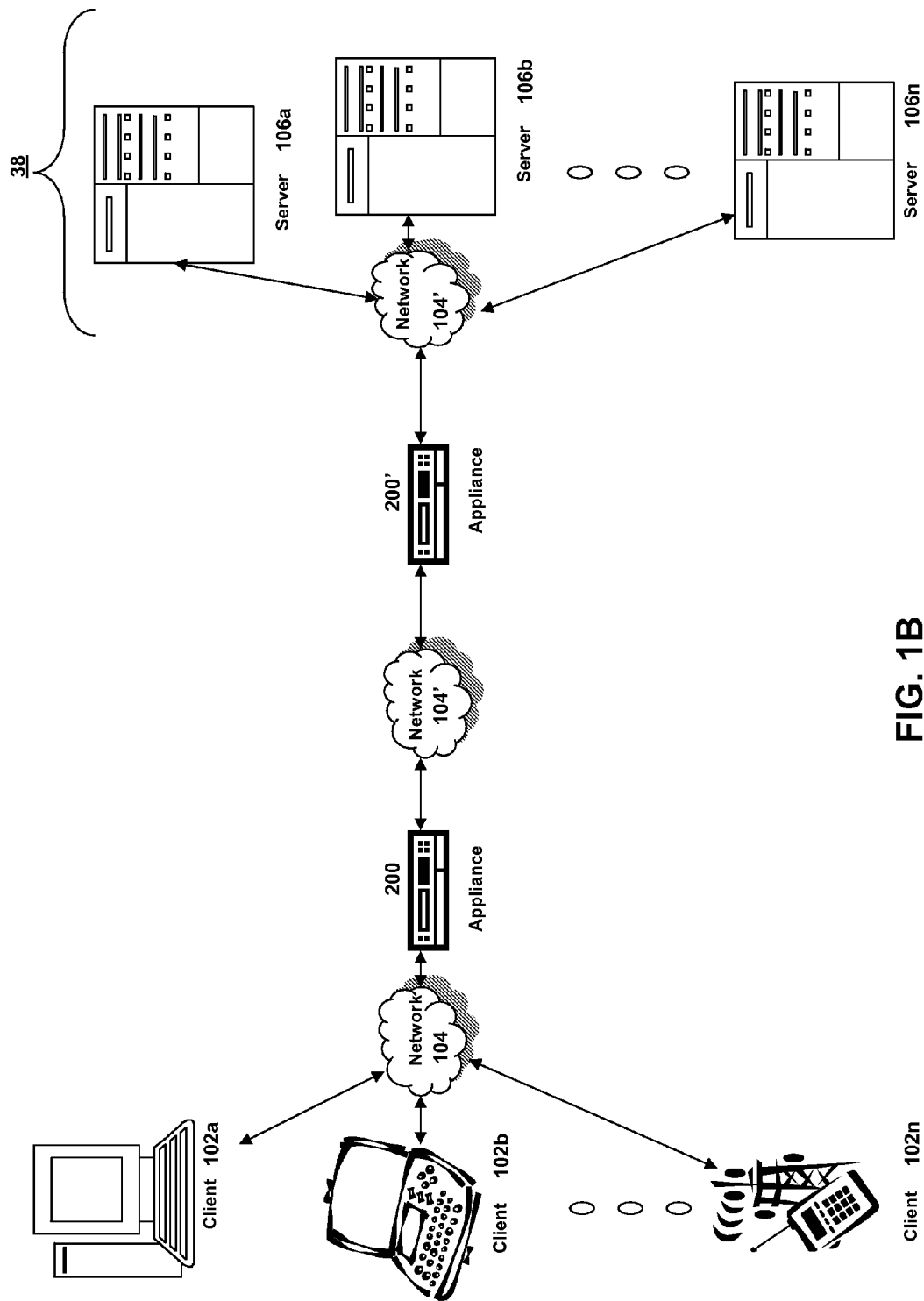
FIG. 1B is a block diagram of another embodiment of a network environment for delivering a computing environment from a server to a client via a plurality of appliances.
Figure 1C:
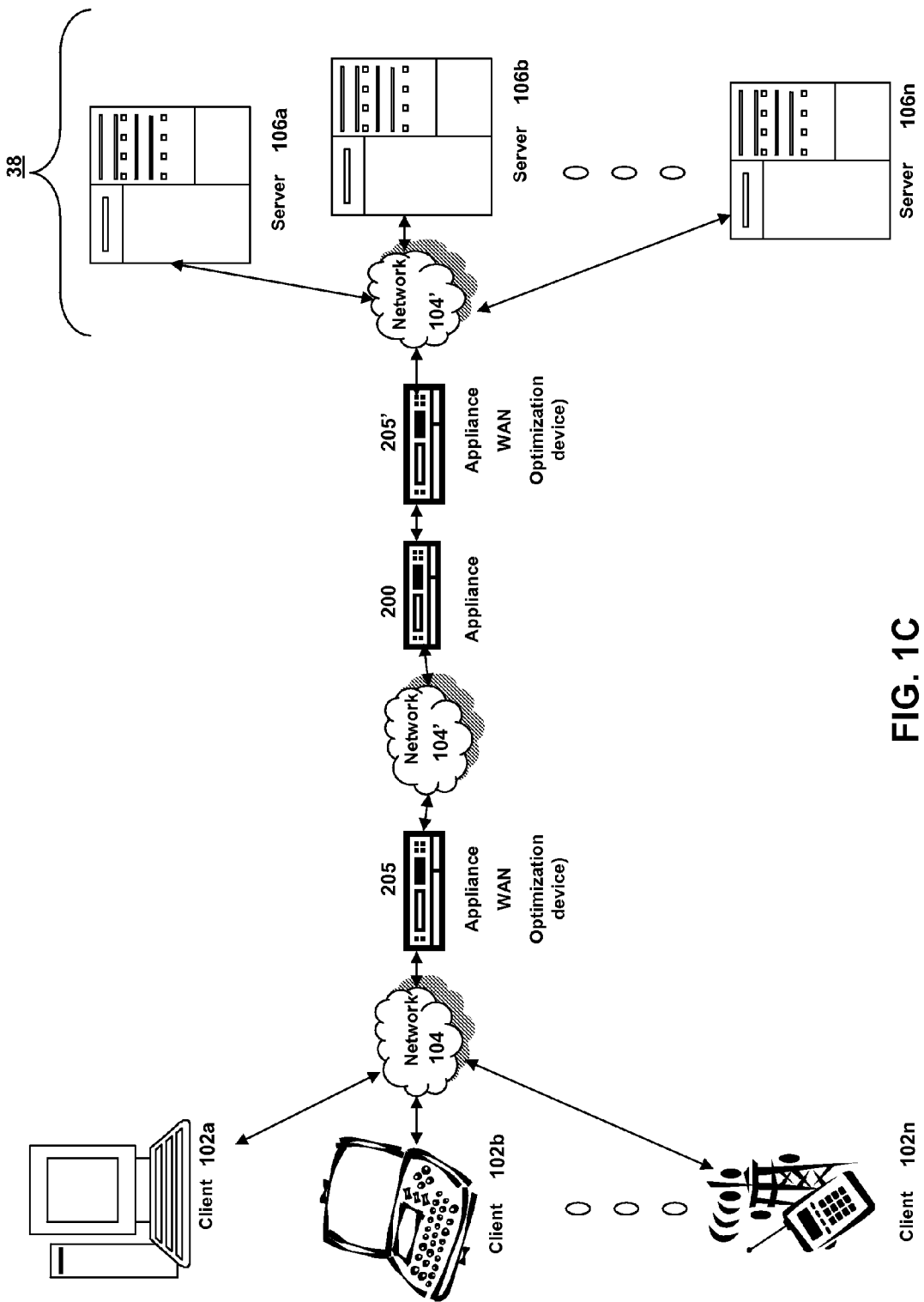
FIG. 1C is a block diagram of another embodiment of a network environment for delivering a computing environment from a server to a client via one or more different appliances.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
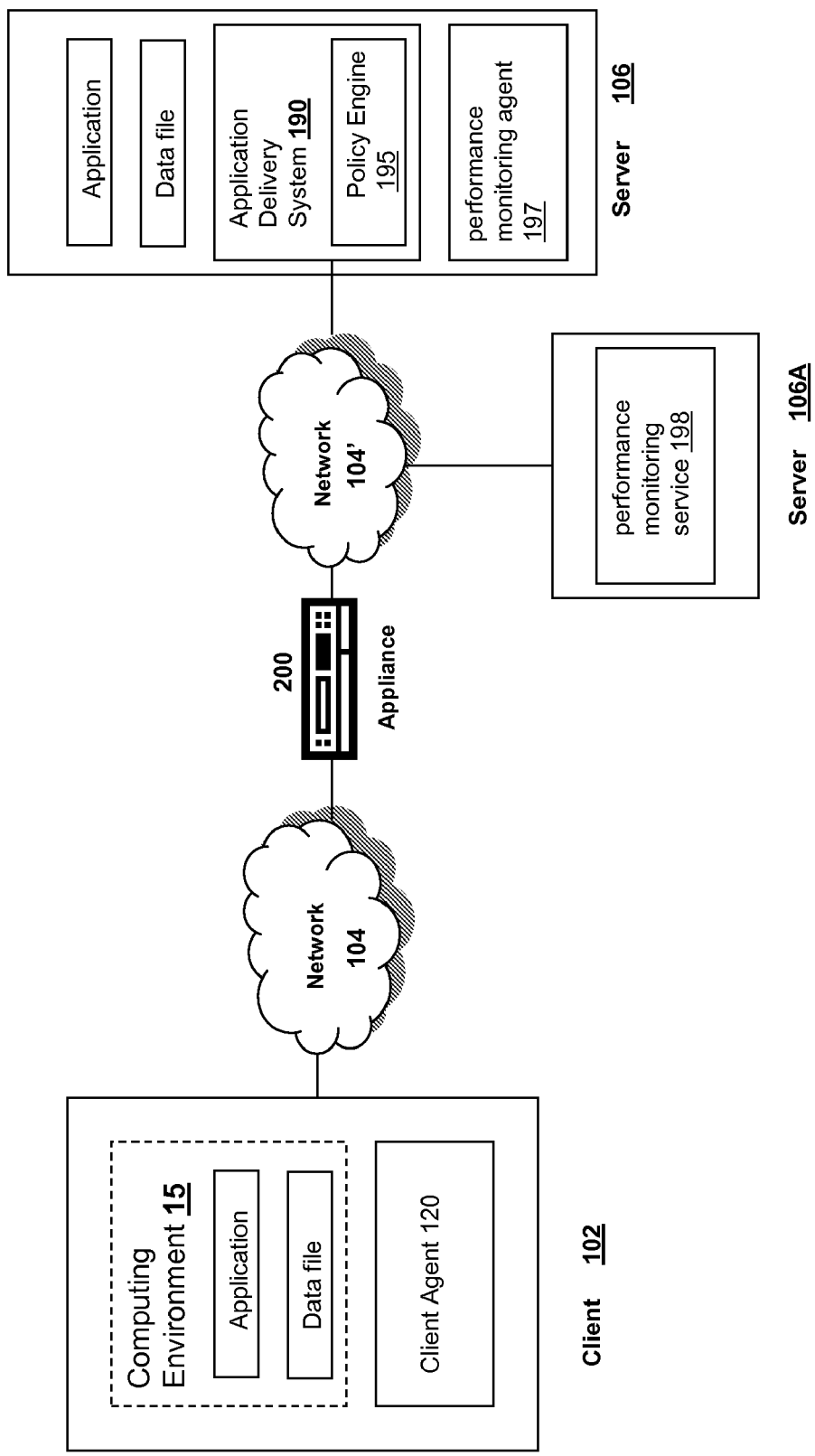
FIG. 1D is a block diagram of an embodiment of an environment for delivering a computing environment from a server to a client via a network.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
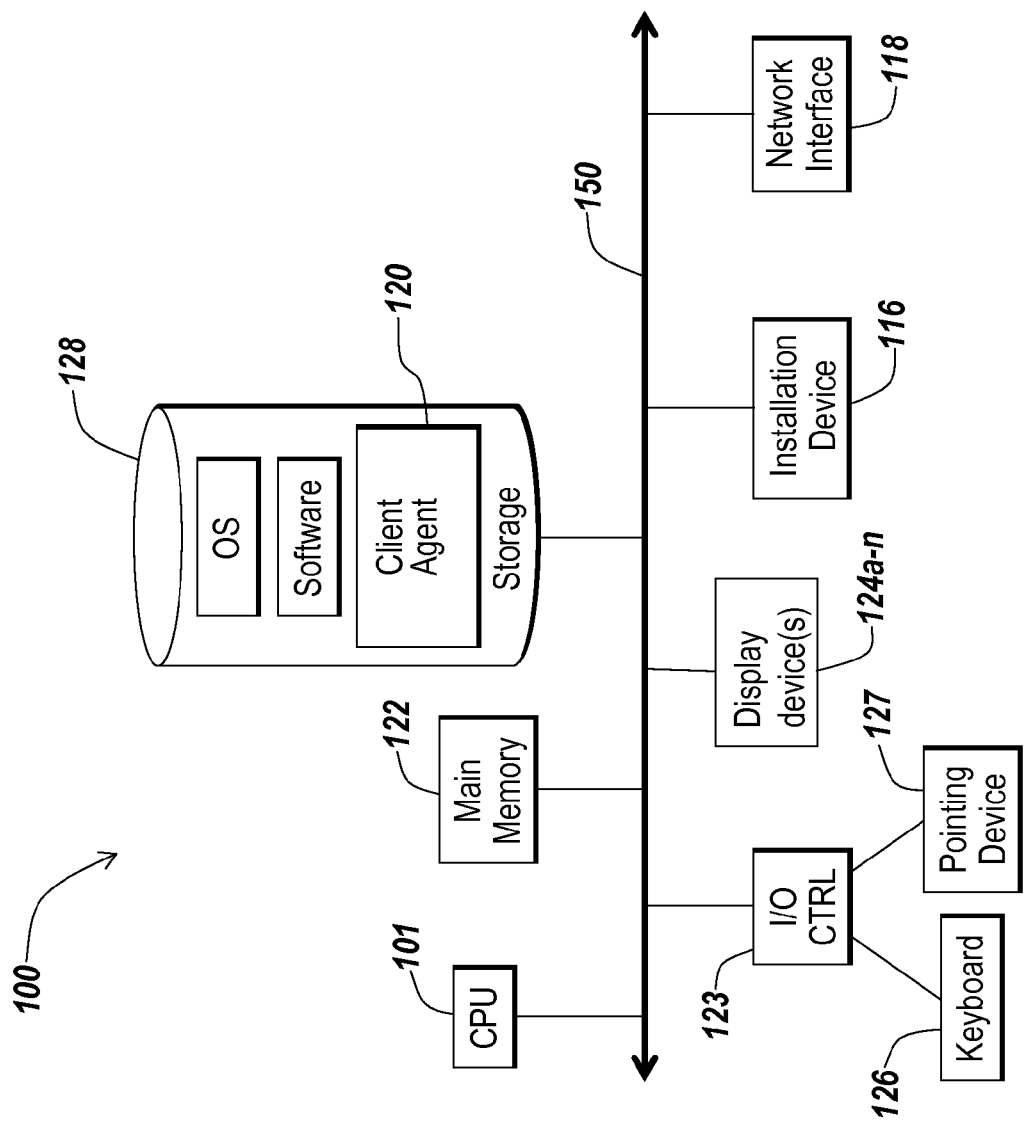
FIGS. 1E and 1F are block diagrams of embodiments of a computing device.
Figure 1F:
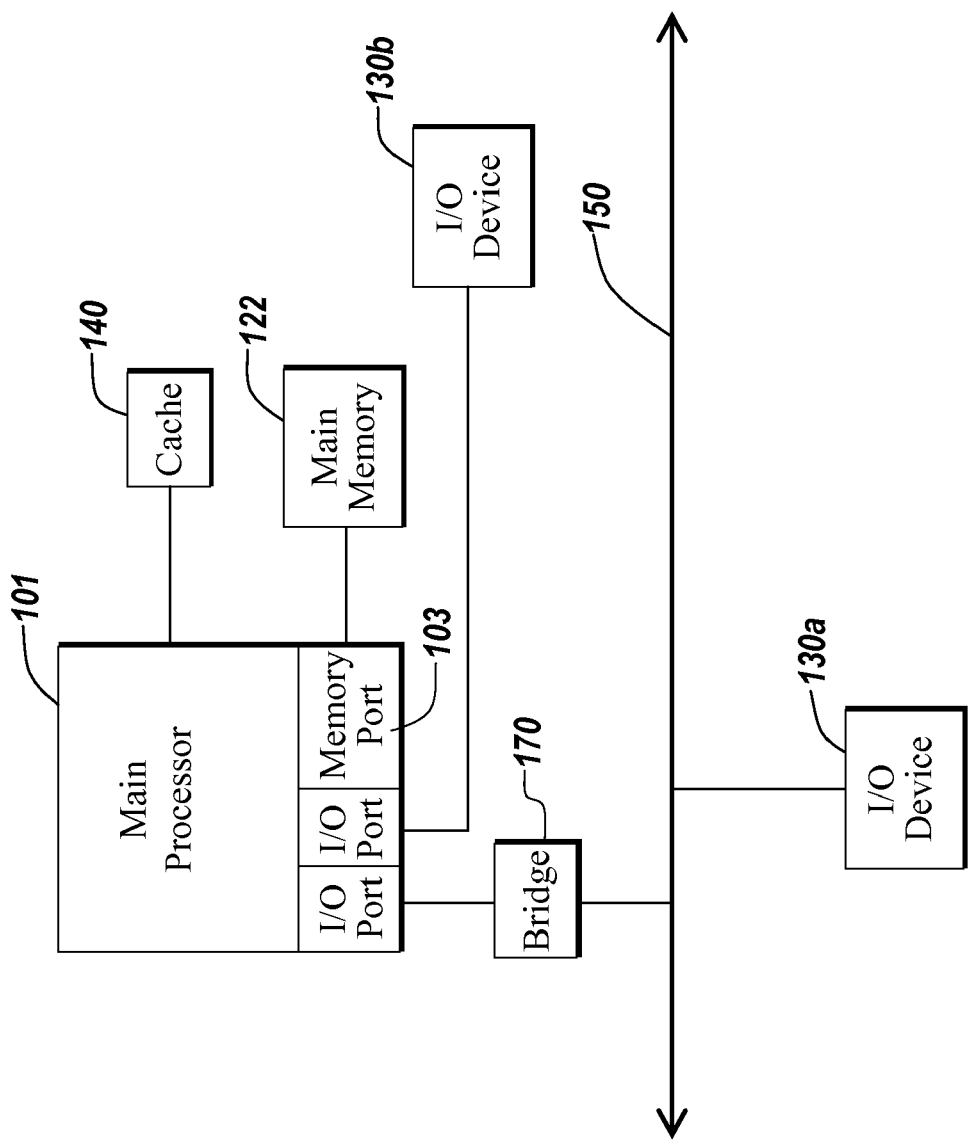

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
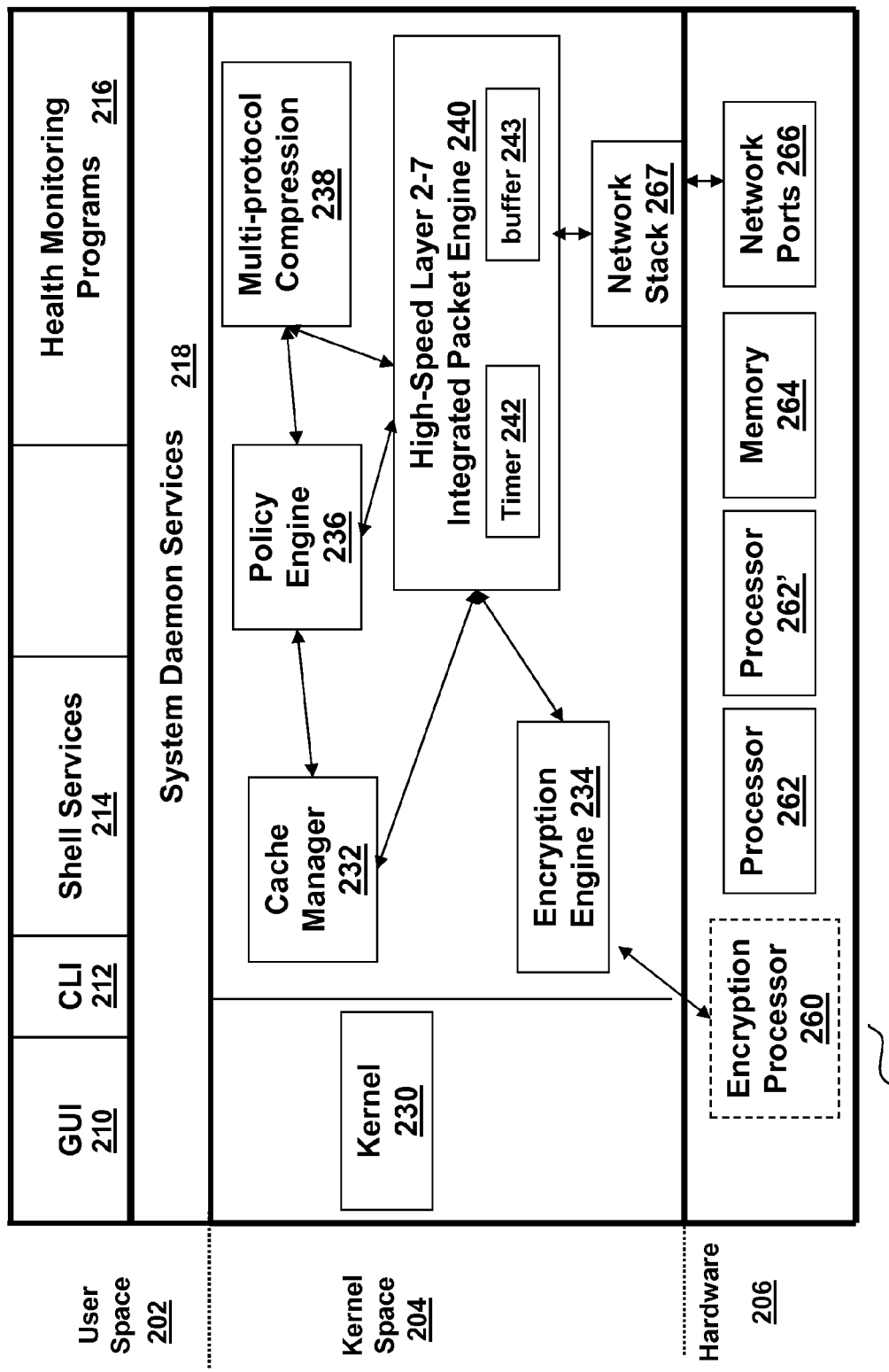
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element that comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

Figure 2B:
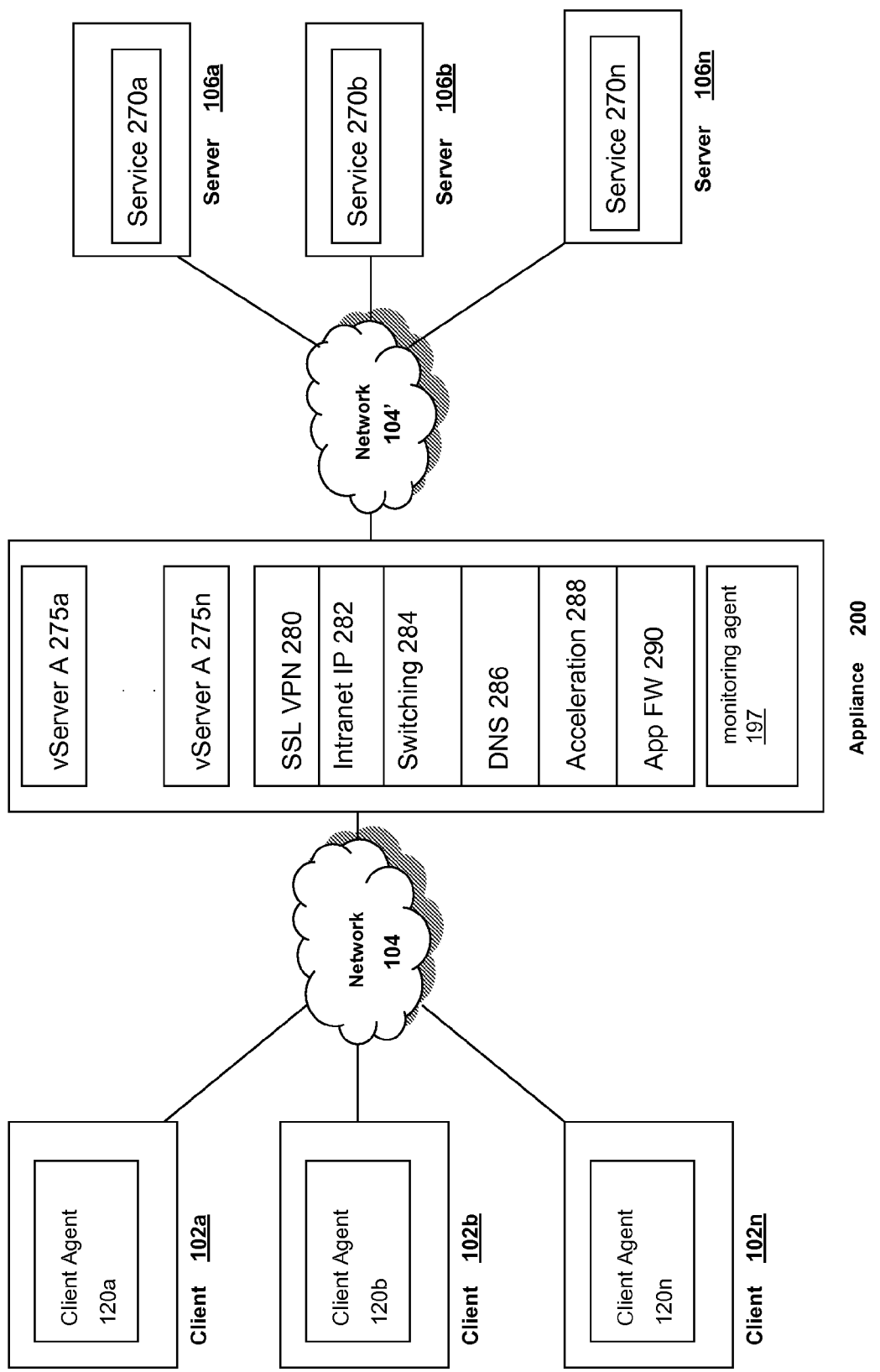
FIG. 2B is a block diagram of another embodiment of an appliance for optimizing, accelerating, load-balancing and routing communications between a client and a server.

In some embodiments, the policy engine 236 may provide a configuration mechanism to allow a user to identify, specify, define or configure policies directing behavior of any other components or functionality of an appliance including, without limitation, the components described in FIG. 2B such as vServers 275, VPN functions 280, Intranet IP functions 282, switching functions 284, DNS functions 286, acceleration functions 288, application firewall functions 290, and monitoring agents 197. In other embodiments, the policy engine 236 may check, evaluate, implement, or otherwise act in response to any configured policies, and may also direct the operation of one or more appliance functions in response to a policy.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
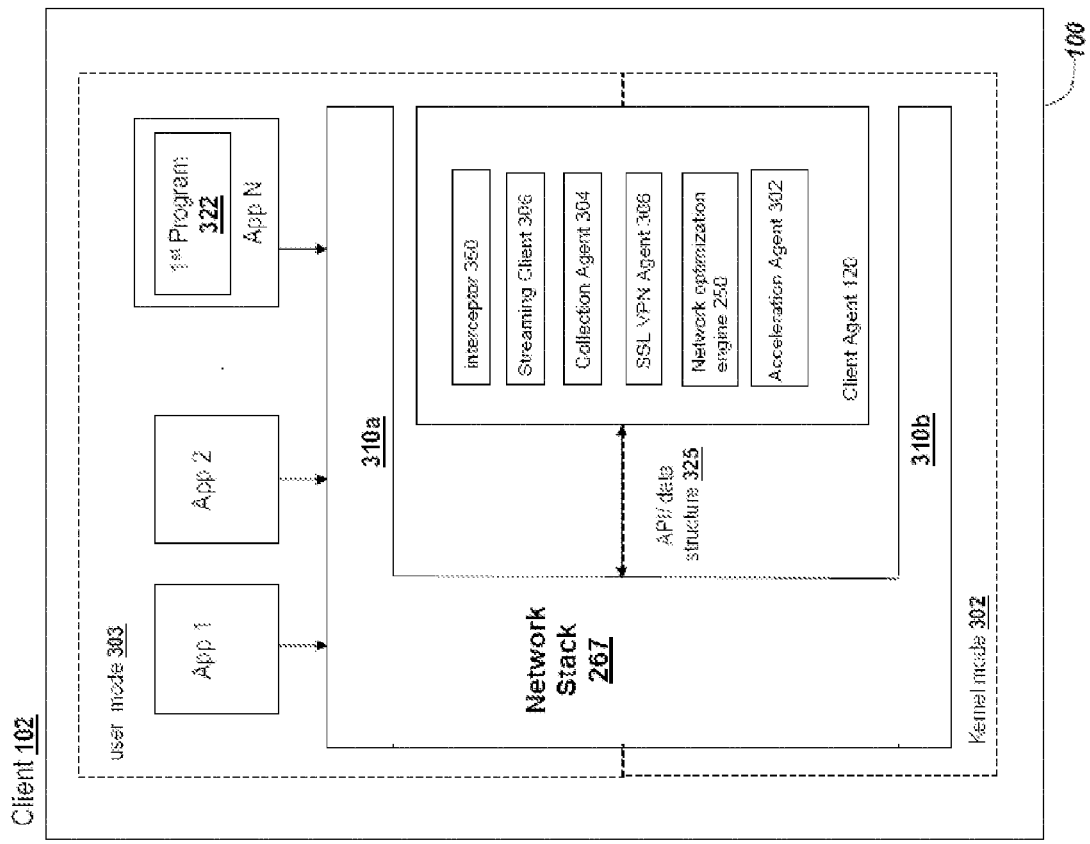
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archives In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Systems and Methods for Configuring and Using Object-Oriented Policy Expressions Referring now to FIG. 4A, an example of a portion of an object model used to facilitate processing of HTTP data is shown. In brief overview, object classes are defined for a number of elements in the HTTP protocol. Defined classes include a request 405, response 410, hostname 415, url 420, query 425, cookie 430, and text 435. Each class is defined to include a number of fields and/or methods, which may include or return objects corresponding to other classes or may include or return other data types, such as integers.

Figure 4A:
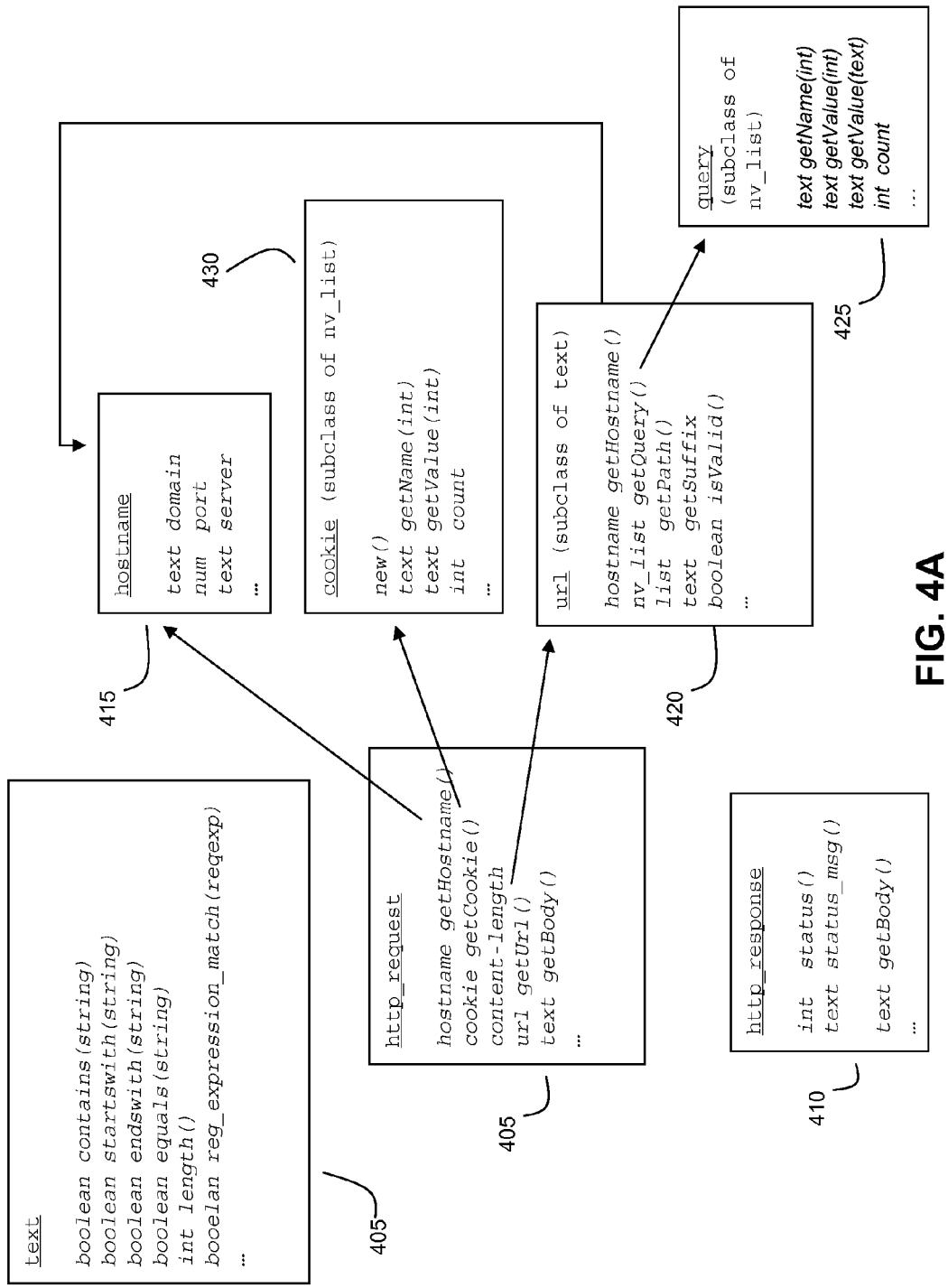
FIG. 4A is a diagram of an example object model that may be used to structure HTTP communications.

Still referring to FIG. 4A, now in greater detail, an object model may comprise a set of defined object classes which allows a computing device to specify and manipulate data, and/or a set of defined object classes which allows a user of a computing device to direct the operations of the computing device. An object model may have any properties associated with object-oriented design or programming including, without limitation, inheritance, abstraction, encapsulation, and polymorphism. Examples of object models that may be used in conjunction with the object-oriented expressions described herein include, without limitation, the Java object model, the Component Object Model (COM), and the HTML Document Object Model (DOM), and any portion or combinations of portions of those models. In some embodiments, an object model or a portion of an object model may correspond to a protocol. For example, an object model may be created to represent HTTP communications, with the object model providing classes and methods for accessing and manipulating HTTP communications. Or an object model may be created to represent TCP, IP, UDP, ICA, or SSL communications. Or an object model may be created to represent an appliance, with the object model providing classes and methods for accessing and manipulating state information relating to an network appliance 200.

An object class may comprise an abstract description of an object and any methods associated with the object. An object, a particular instance of a class, may represent any type or form of data, process, or protocol. Example objects may include, without limitation, strings, text, numbers, lists, protocols, data streams, connections, devices, data structures, systems, and network packets.

An object class may have a number of members. A member of an object class may comprise any field, method, constructor, property, or variable specified by the object class. In some embodiments, a member of an object class may comprise an object of a second object class. For example, in the embodiment shown, the object class "http_request" 405 contains a method "getUrl" which returns a url object. In other embodiments, a member of an object class may be a primitive data type of an underlying architecture, such as an integer, floating point number, byte, array, or boolean variable. For example, the class "cookie" contains a field "count" which is an integer identifying the number of name-value pairs in the list. In still other embodiments, a member of an object class may comprise a constant. In still other embodiments, a member of an object class may comprise a method.

In some cases, a member of an object class may be defined in the object class definition. In other cases, a member of an object class may be defined in a parent class of the object class. In still other cases, a member of an object class may be defined in a parent of the object class and modified in the class definition for the object. For example, both the "cookie" 430 and "query" 425 classes inherit the methods "getName" and "getValue" from their parent class "list_nv" which is a class representing lists of name-value pairs.

In the embodiment shown, the http_request class 405 contains a number of methods which may be used to process an HTTP request. Fields and methods me be provided to identify and manipulate any portion or portions of an HTTP request including, without limitation, the URL, cookie, body, content-type, date, version, and hostname. In one embodiment, a method or methods may be provided to determine whether a given data stream is a validly formatted HTTP request. A similar class and/or methods may also be provided for an HTTP response.

The url class 420 shown may comprise any number of fields and methods for operating and identifying a url. In one embodiment, the url may contain methods for parsing one or more of a hostname, port, server, domain, file suffix, path, and query. In one embodiment, the url may be a subclass of a general text object, which may allow the url to be treated as unformatted text. For example, the url class 420 may be a subclass of the text class 435. In one embodiment, the url class may comprise methods for rewriting all or a portion of the url. In some embodiments, the url class may be applied to any portion of text. For example, the url class may comprise a constructor which accepts a string of text and creates a url object by parsing the string. In these and other embodiments, the url class may comprise a method for indicating whether a URL is a properly formatted URL. In some embodiments, a URL class may comprise a method for identifying one or more URLs in a text string. For example, a static method "findURL" might be provided which returns a list of validly formatted URLs in a given text sequence. This method could be used, for example, to find a number of URLs contained in the body of an HTTP response. The url class may then provide methods for modifying one or more of the found URLs.

The cookie class 430 may comprise any number of fields and methods for identifying and processing a cookie. In one embodiment, the cookie may be an HTTP cookie. In the embodiment shown, the cookie class represents a cookie as a list of name value pairs. The "getValue" method, in response to receiving a number n, may return a text object of the nth value in the list. The getName method, in response to receiving a number n, may return a text object of the nth value in the name. In other embodiments, a cookie may be represented using any other syntax or data type including, without limitation, a string, or linked list. In some embodiments, the cookie class may provide a method for inserting and/or altering a cookie. In other embodiments, a HTTP response or request object class may provide a method for inserting or modifying a cookie contained in a request or response.

The "text" class 435 shown may comprise any number of fields and/or methods for operating on a text sequence. A text sequence may comprise any sequence of bytes capable of being treated as characters. In some embodiments, a text object may comprise a discrete sequence of bytes. In other embodiments, a text object may comprise one or more bytes of a byte stream. In these embodiments, a text object may be used to operate on portions of the byte stream even if the entire stream has not been received. Methods that may be used in conjunction with text objects may include, without limitation, comparisons, truncations, searches, sorts, and regular expression matching and searching. For example, a method may be provided to determine whether a given substring is found within a text object. Or for example, a method may be provided to determine a portion of a text object preceding a special character. Or, for example, a method may be provided for identifying a sequence of text following a given regular expression.

In some embodiments, methods may also be provided for formatting or confirming formatting of text so that it can be processed by other classes and/or methods. For example, a method may be provided that ensures a text object may be treated as XML. This method might check that the text object conforms to proper XML formatting and does not contain any malicious or inadvertent errors. Or, for example, a similar method may be provided to determine whether a text sequence can be treated as a URL. This method may, for example, find and replace any characters which need to be replaced by escape sequences so that the text object conforms to proper URL formatting conventions.

An object model may be implemented using any physical data structures or other underlying physical implementations. In some embodiments, a number of objects may access the same object in physical memory to perform the methods associated with each object. In one embodiment, the object model shown may be implemented so that a plurality of object instances operate on a underlying data stream, without needing to produce separate copies of the data stream for each object instance. To give a detailed example, with respect to the object model shown, an appliance may receive an HTTP communication from a client and store it in memory. The appliance may then execute identify a http_request object, and then call functions in the http_request object class 305 to obtain a url and/or a cookie object. The appliance may then call addition functions or reference fields in the url and cookie objects. Some or all of these methods may operate by parsing some or all of the underlying data stream, and then returning references to portions of the stream. For example, a url object may store the beginning and ending memory locations of the url in the underlying data stream. Each method of the url class may then parse and/or modify portions of data within the identified memory locations. In this manner, the appliance may be able to process a data stream using an object model without having to maintain additional copies of data in the data stream.

In other implementations, one or more additional copies of some or all of a data stream may be made with respect to some objects. These object may perform operations on a copy of a portion of data stream, and, as may be appropriate, update the data stream with any changes made to the copy.

The object model shown and others may specify object classes and data structures that can be applied to any input stream. For example, the object model shown may be used to treat any input stream as an http_request object, and then utilize any of the functionality provided by the http_request object class. Further, although the object model shown relates to HTTP data, other object models may be used to provide functionality with respect to TCP, SSL, or ICA streams. In some embodiments, an object model and implementation may be provided such that an appliance may select from a number of object models to process a given data stream. For example, upon receiving a given data stream, an appliance may determine that the data stream is an ICA stream, and apply an appropriate object model for processing the ICA stream. However, if HTTP data is transmitted within the ICA stream, the appliance may also apply an HTTP object model, such as the one shown, for processing the HTTP data. In this way, an appliance may specify any structure or structures to apply to a received byte stream.

Figure 4B:
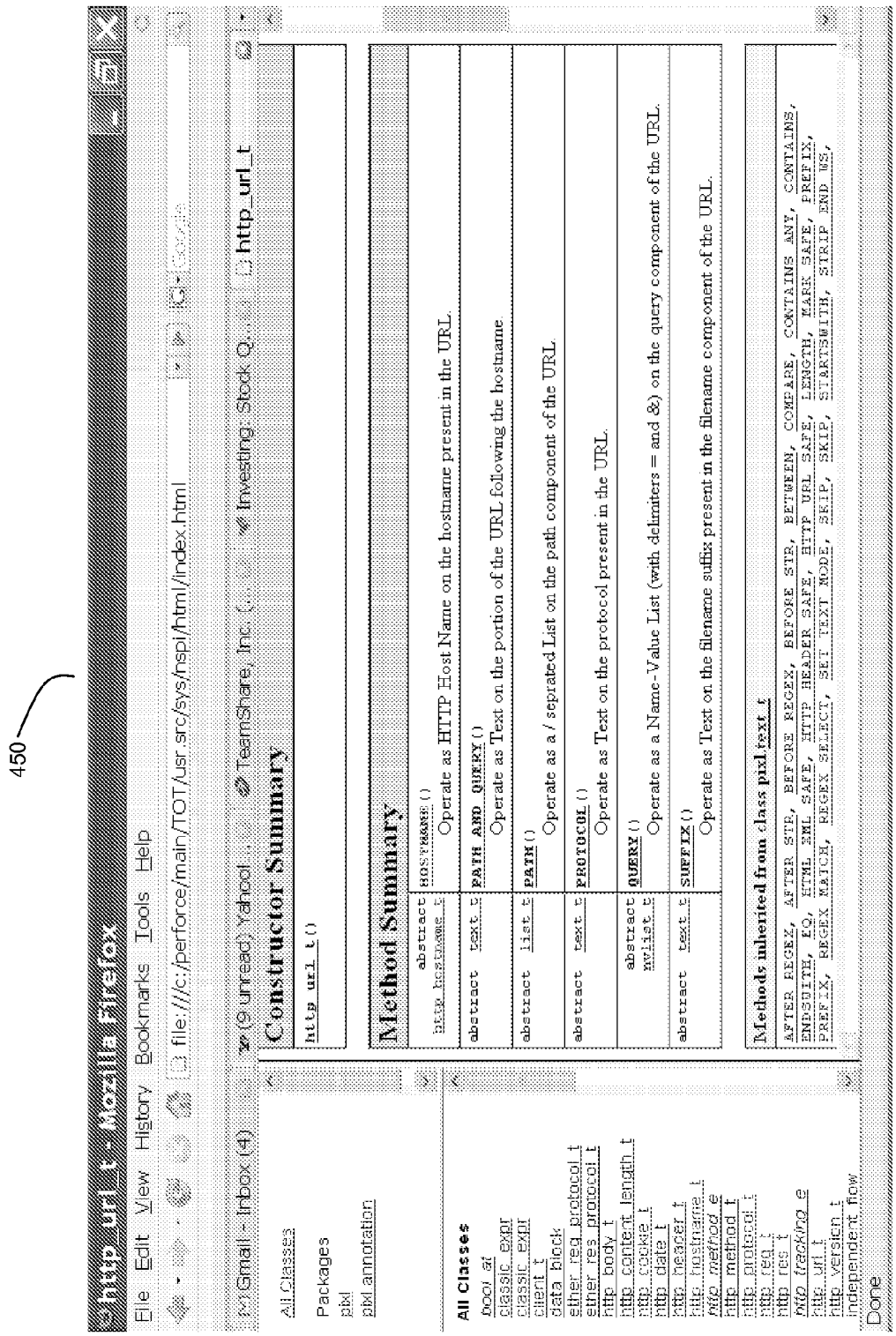
FIG. 4B is an example screen of documentation for an object model that may be used to structure HTTP communications.

Referring now to FIG. 4B, an example documentation screen for an object class representing a URL is shown. In brief overview, the documentation screen comprises a partial list of a number of methods and a constructor for the "http_url_t" class, which represents a URL. The documentation screen indicates a number of methods are implemented in the "http_url_t" class, and a number of methods implemented in the parent class "text_t." These classes may correspond to the "url" and "text" classes described with respect to FIG. 4A.

Figure 4C:
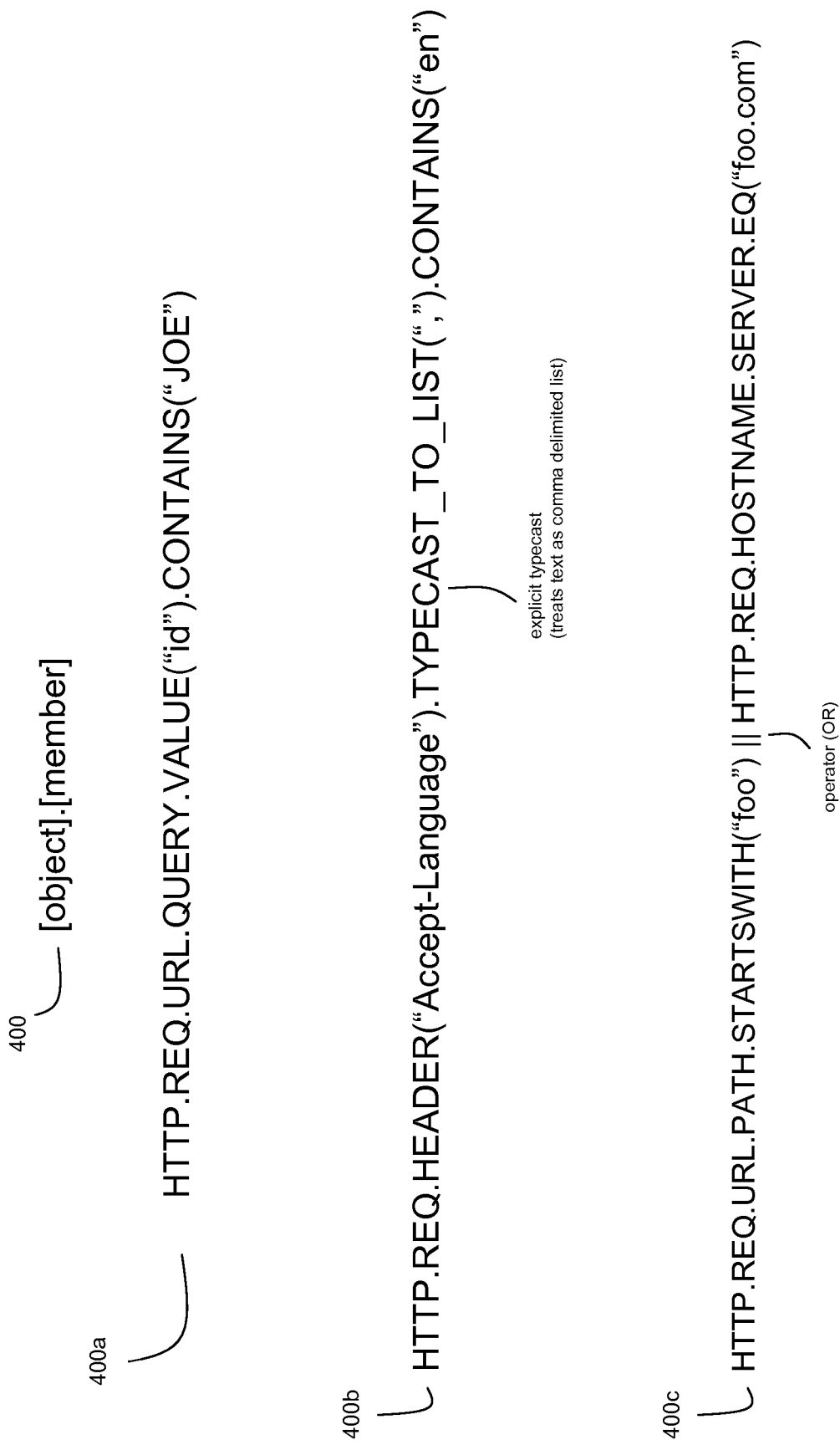
FIG. 4C illustrates a number of example object-oriented expressions relating to HTTP communications.

Referring now to FIG. 4C, a number of example object-oriented expressions for use in a policy engine are shown. In brief overview, an object oriented expression 400 contains a number of object classes, which may correspond to protocols, protocol objects, data structures, and data types. An object-oriented expression may specify a member of an identified object, which may comprise methods, data types, or other object classes. A number of example object-oriented expressions 400a, 400b, 400c are shown. These object oriented expressions may be used by a network device in performing any function including, without limitation, analyzing traffic flows, identifying system properties, load balancing, content switching, and application security.

Still referring to FIG. 4C, now in greater detail, object-oriented expressions may comprise any expression which allows the specification of data and functions with respect to an object model. A first example object oriented expression 400 identifies an object class and a member of the object class. In the syntax of the object-oriented expressions shown, a member of an object is designated by a period following the object and then a string naming the member of the object. For example, HTTP.REQ identifies the member method named "REQ" for the HTTP object. In this example, method names may be denoted with all uppercase. In other embodiments, any other syntax may be used to specify object-oriented expressions. Examples of syntaxes that may be used include, without limitation, the syntax or a combination of syntaxes of ActionScript, Java, JavaScript, C#, Visual FoxPro, VB.Net, C++, Python, Perl, PHP, Ruby and/or Objective-C.

In the example object-oriented expression 400a, the expression identifies the protocol HTTP. In one embodiment, HTTP may correspond to an object class, an abstract object class, a static object class, or any other component of an object model. In some embodiments, HTTP may be a parent class of a number of object classes used to represent and process HTTP communications. In other embodiments, "HTTP" may be a static class or method comprising one or more objects and/or methods relating to the representation and processing of HTTP communications. For example, the expression "HTTP.REQ" may return an object corresponding to an HTTP request within a data stream. In one embodiment, this object may be an instance of an object class such as the "http_request" class discussed in FIG. 4A. In the embodiment shown, the expression 400a may return a boolean value indicating whether "joe" is contained in a value named "id" in the query portion of a URL of an HTTP request.

The example object-oriented expression 400b provides an example of explicit typecasting, which may be used to specify structure with respect to arbitrary portions of a data stream. In the example, the string returned from a HTTP request header item corresponding to the Accept-Language is explicitly typecast into a list. The TYPECAST_TO_LIST method accepts as an argument the list delimiter, and returns a list based on the delimiter. The expression then identifies a CONTAINS method to determine whether one of the list elements is "en". This example 400b may be used to configure a device to detect whether an HTTP request indicates the requestor accepts English as a language. In some embodiments, an object model and expression syntax may allow a data stream to be explicitly typecast into any object class. This may allow a user configuring a device to specify arbitrary structures to be applied with respect to a data stream. This may in turn allow a user to leverage knowledge of a protocol or convention to format input streams in a manner convenient for processing.

As another example of an explicit typecasting, the expression HTTP.RES.HEADER("Location").TYPECAST_TO_URL.QUERY may be used to typecase an element of the HTTP header so that it is treated as a URL. By typecasting text elements to a URL, the URL processing methods may be made available to analyze content in any portion of a network traffic stream.

In some embodiments, two or more object-oriented expressions may be used in conjunction with an operator, such as AND, OR, NOT, GREATER THAN, or LESS THAN, to produce a value. For example, in expression 400c two expressions which may return boolean values are joined with an OR operator. The result of the combined expression will be the OR of the values returned by the two expressions. In other embodiments, operators may work with respect to any objects or data types including, without limitation, integers, floating point numbers, and strings.

Though the specific examples shown reflect object-oriented statement in the context of an HTTP object model, object-oriented statements and models may be used to access any portions or portion of network traffic passing through a device. In addition, object-oriented statements and models may be used to access system properties of a device, or properties of a given connection or connected device.

In one embodiment, an object-oriented expression may be used to base network device behavior on any properties of the device. For example, the expression SYS.TIME.WITHIN (time1, time2) might be used to base behavior based on a time of day, or day of year. Or, for example, the expression SYS.CONNECTIONS.SSL_OPEN.COUNT might be used to return a count of the total number of SSL connection are currently open with a system. In both of these examples, the SYS object represents the system executing the policy, and a number of methods and/or fields are provided within the SYS object to access information about system status.

In another embodiment, an object-oriented expression may be used to base network device behavior on any properties of a client connected to the device. In one embodiment a "CLIENT" object might be provided to represent the properties of a client sending or receiving a currently processed data stream. For example, the expression: CLIENT.IP.SRC. IN_SUBNET(10.100.202.0/24), might be used to return a true/false value based on whether a client corresponding to a data stream is in a given subnet. Or, for example, the expression CLIENT.AGENT.VERSION_NUM might be used to retrieve the version number of a client agent executing on the client. Or, for example, the expression CLIENT.VLAN.VIRTUAL_IP might be used to access the virtual IP address of a client.

In still another embodiment, an object-oriented expression may be used to base network device behavior on any property of a server connected to the device. For example, SERVER.METRICS.HTTP.AVG_RESP_TIME might be used to access the average response time of a server for generating HTTP requests. Or, for example, SERVER.ICA. MAX_CONNECTIONS. might be used to identify a maximum number of ICA connections specified for a given server. Or, for example, SERVER.ETHER.HEADER might be used to identify the ethernet packet headers of a given connection to a server.

In some embodiments, an object-oriented expression may be used to buffer a certain amount of a communication before or during processing. For example, an appliance serving as a proxy for HTTP communications may wish to base some behavior on an initial part of the response. In this case, it may be desirable to only buffer a portion of the response, so that end-to-end response time does not unduly suffer. In one embodiment, an expression may specify a number of bytes to receive before an expression is evaluated. For example, the expression HTTP.REQ.getBody(5000).TYPECAST_TO_NV_LIST('=', '&').getValue("id") may be used to buffer the first 5000 bytes of an HTTP request body, and then treat those bytes as a name-value pair list. The expression then specifies to get the value corresponding to the name "id."

Figure 5:
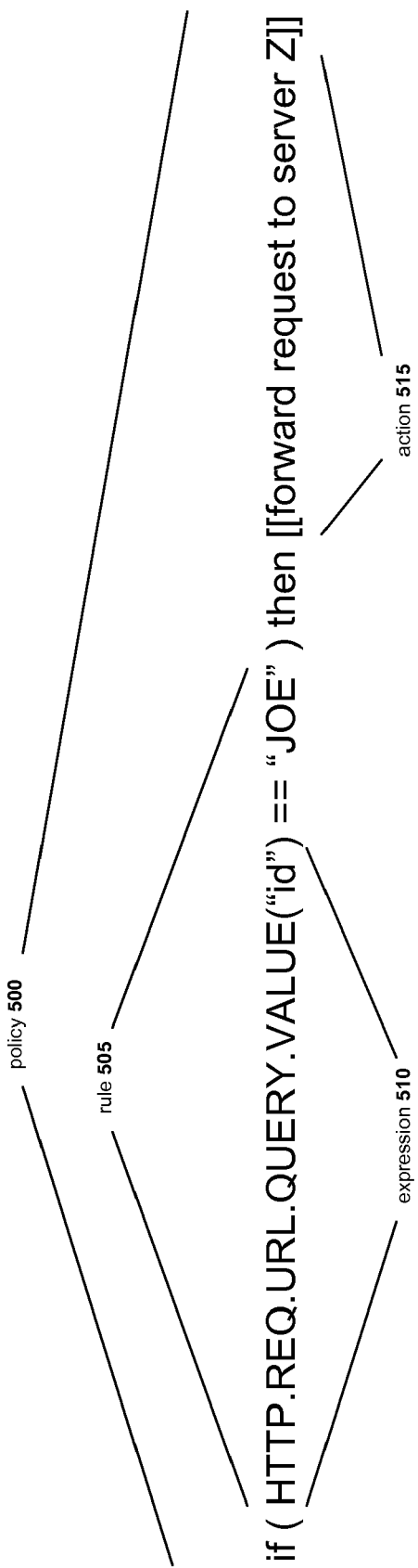
FIG. 5 illustrates an example of a policy.

Referring now to FIG. 5, an example of a policy which may be used in configuring a device is shown. In brief overview, a policy 500 comprises an expression 510 which may be evaluated in the context of a rule 505. A policy 500 may also comprise an action 515 which specifies an action to be taken if the rule is satisfied.

Still referring to FIG. 5, now in greater detail a policy may be used to configure a device. In some embodiments, a policy may be used to configure any device including, without limitation, a WAN optimization appliance 200, an SSL/VPN appliance 200, an acceleration appliance 200, a caching appliance 200, a load balancing appliance, and/or a device providing any combination of features of those devices. In other embodiments, a policy may be used to configure a client agent or server agent.

In some embodiments, a policy engine executing on a device may interpret, evaluate, and/or execute policies with respect to functions of the device. For example, a policy engine 236 may execute on an appliance 200 and interpret and execute a number of policies directing other actions and modules of the appliance including, without limitation, an SSL/VPN module 280, an Intranet IP module 282, a switching module 284, a DNS module 286, an acceleration module 288, an application firewall module 290, and/or a monitoring agent 197. In some embodiments a single set of policies may be provided for directing a plurality of appliance functions. In other embodiments, a separate set of policies may be used to configure each of a number of appliance functions. Policies may be stored in any manner within a device. In some embodiments, a policy may be compiled before it is executed on a device. In other embodiments, a policy may be interpreted at runtime.

A policy 500 may comprise one or more expressions 510. An expression in a policy may be evaluated by a device at runtime with respect to the objects specified in the expression to produce a value. An expression 510 may be any type of expression. In one embodiment, an expression 510 may be an object-oriented expression. An expression may be used anywhere within a policy. In some embodiments an expression may be specified in a rule of a policy. In other embodiments, an expression may be specified in an action of a policy.

A policy 500 may also comprise a rule 505. The rule may be evaluated at runtime with respect to objects, methods, and operators identified in the rule to produce a result. Depending on the result, the appliance may then execute one or more actions specified in the policy. For example, if a rule evaluates to "true" an appliance may execute the action associated with the rule. Or if a rule evaluates to "false" and appliance may not execute the action associated with the rule. In some embodiments, a rule may comprise a single expression. In other embodiments, a rule may comprise a plurality of expressions connected by operators.

A policy 500 may also comprise an action 515. An action may specify any action to be taken. Examples of actions may include, without limitation, blocking or allowing a data stream, forwarding a data stream or object to a given server or device, storing an object in memory, altering a portion of a data stream, altering one or more system properties, performing an acceleration technique, and performing a compression technique. In the policy 500 shown, upon determining that an HTTP request URL contains a user identifier of "JOE", the policy dictates an action of forwarding the request to a specified server. In some embodiments, an action may comprise an expression to be evaluated at runtime Referring now to FIG. 6, an example of an expression input screen 600 for a user to input an object-oriented expression is shown. In brief overview, an expression input screen 600 comprises a number of pull-down menus 620 which allow a user to specify members of classes to include in a created expression. The screen 610 may also comprise a display where a user may be able to see and/or edit a text version of the expression. The screen may further comprise a display 630 which displays to the user information corresponding to one or more objects.

Figure 6:
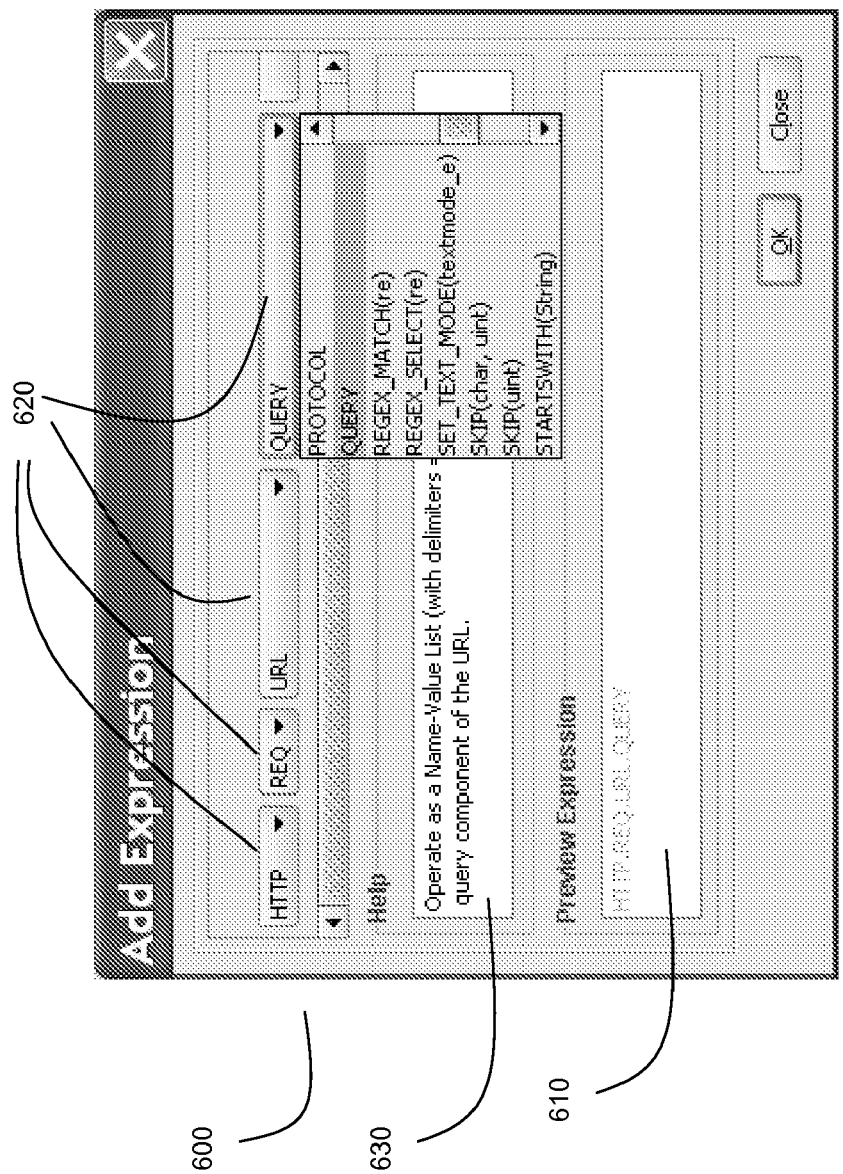
FIG. 6 is an example screen that may be used to configure one or more expressions.

Still referring to FIG. 6, now in greater detail, an expression input screen allows input of object oriented expressions by a user in any manner. In the embodiment shown, pull-down menus 620 may be used to select objects. In other embodiments, any other input elements may be used to accept an object oriented expression including, without limitation, text fields, menus, buttons, checkboxes, and toolbars. In some embodiments, input elements of a screen 600 may provide functionality for a user to create and verify valid expressions. In some embodiments, the pull-down menus 620 may be automatically populated with members of the previous specified class. For example, upon a user selecting "URL" in the menu shown, the next pull down menu may be populated with the members of the URL object class. In this way a user may be able to efficiently navigate class hierarchies and object models to generate an expression. In other embodiments, syntax highlighting, auto-completion, and/or auto-recommendation may be used to enable a user to easily create and verify expressions. For example, a user may be provided with a text field 610 to compose an expression, wherein the text field highlights in red any unrecognized objects or syntax. Or for example, a user may be provided with a text field 610 which, upon a user typing an object class, the text field displays a list of members of the object class.

In some embodiments, an expression input screen 600 may display to the user information about any objects or expressions. In some embodiments, the screen 600 may display the properties and/or recommended uses of a given class. In one embodiment, the screen 600 may be integrated with or used alongside one or more class documentation screens such as depicted in FIG. 4B.

Figure 7A:
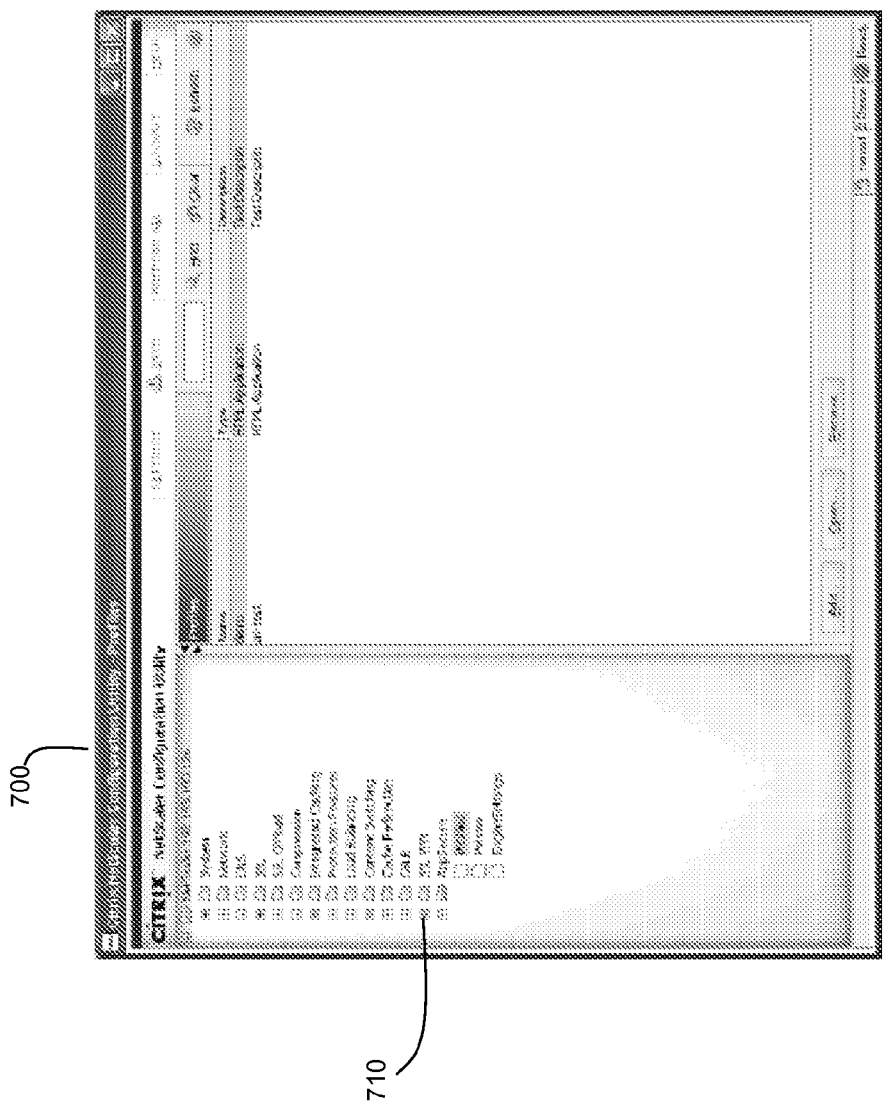
FIG. 7A is an example screen of a configuration interface that may be used to configure policies for a network device.

Referring now to FIG. 7A, an example of a configuration interface screen which may be used to configure a plurality of policies corresponding to one or more network devices is shown. In brief overview, a screen displays a list of network device functions 710 with folders containing one or more policies, policy groups, or settings related to the functions. In the example shown, the screen displays folders for system policies, network policies, DNS policies, SSL policies, SSL offload policies, compression policies, integrated caching policies, protection features, load balancing policies, content switching policies, cache redirection policies, global load balancing policies, SSL VPN policies, and application security policies. In some embodiments, a number of policies, policy groups, and/or settings corresponding to a function may be referred to as a profile.

Still referring to FIG. 7A, now in greater detail, a configuration interface may allow a user to specify policies or settings related to one or more network devices. In some embodiments, a configuration interface may be used to configure an appliance 200 including, without limitation, a VPN appliance, acceleration appliance, or WAN optimization device. In some embodiments, a single configuration interface may allow a user to configure a plurality of appliances. For example, a user may be able to specify one or more appliances to apply a given policy, policy group, or setting to. In one embodiment, a user may be able to specify that a number of appliances share a configuration profile. For example, a user may configure a cluster of appliances 200 such that each appliance has the same policy settings. In other embodiments, a configuration interface 700 may be used to configure one or more client agents 120.

A configuration interface 700 may comprise any means of collecting input including, without limitation, GUIs, and command-line interfaces. A configuration interface may comprise one or more expression input screens 600. In one embodiment, a configuration interface may read configuration information from a file. In another embodiment, a configuration interface may receive configuration information over a network. For example, a configuration interface 700 may comprise means for a user to download one or more policies, settings, policy groups, or profiles. These may comprise commonly used policies or settings for a number of applications.

A configuration interface may obscure any aspects of a policy, policy group or configuration from a user. For example, a configuration interface may fill in any portions of a policy or policy group automatically or by default such that the user does not need to actively configure those portions. For example, a configuration interface may provide a default list of actions, where the user only needs to specify a list of rules under which the actions should be taken. The syntax and implementation of the actions may be completely or partially hidden from the user.

Figure 7B:
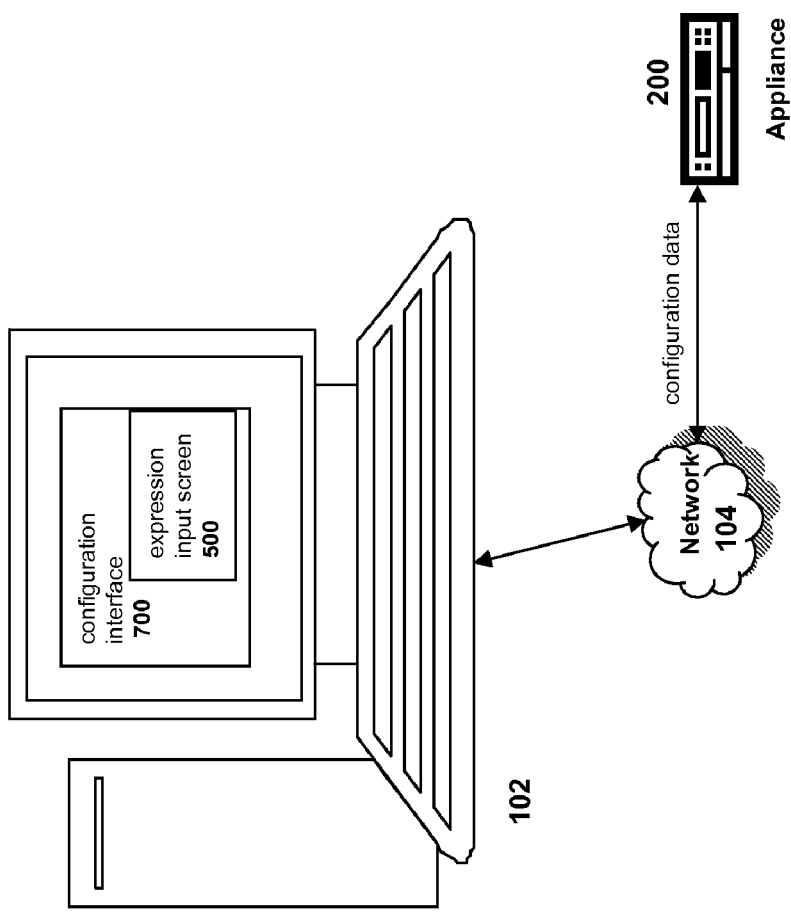
FIG. 7B is a block diagram of one embodiment of a configuration interface executing on a client.

Referring now to FIG. 7B, an example of using a computer to configure an appliance using a configuration interface is shown. In brief overview, a configuration interface 700 comprising an expression input screen 500 is displayed on a client 102. The client 102 transmits the configuration data received via the configuration interface to the appliance 200.

Still referring to FIG. 7B, now in greater detail, a configuration interface 700 may be displayed on a client 102 in any manner. In some embodiments, a configuration interface 700 may comprise an application executing on the client. In other embodiments, a configuration interface 700 may comprise a web page displayed by the appliance. In still other embodiments, a configuration interface 700 may comprise a web page displayed by a third device.

A configuration interface 700 may comprise any means for a user to input configuration data including, without limitation, text fields, menus, buttons, windows, checkboxes, and drag-and-drop functions. In some embodiments, a configuration interface 700 may comprise an expression input screen 500. In other embodiments, a configuration interface may also provide screens for a user to input one or more policies. In some embodiments these screen may be integrated with one or more expression input screens.

A configuration interface may transmit configuration information to an appliance 200 by any means. The configuration information may be transmitted via any protocol or protocols. In one embodiment, user-inputted configuration information may be saved to a file on the client 102, and then the file may be transmitted to the appliance. In other embodiments, a user may input information into a web page or a web application which may then transfer the configuration information to the appliance. In some embodiments, the configuration information may be compiled, formatted, or otherwise processed before it is transmitted to the appliance 200. In still other embodiments, the configuration information may be compiled, formatted, or otherwise processed after it has been received by the appliance.

Figure 8A:
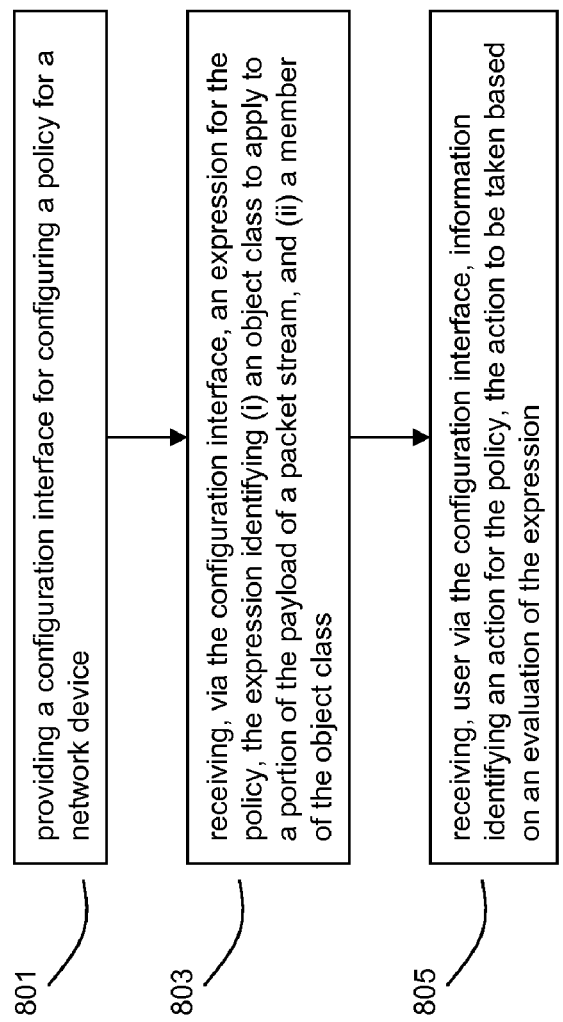
FIG. 8A is a flow diagram of one embodiment of a method for configuring a policy expression.

Referring now to FIG. 8A, an embodiment of a method of configuring an object-oriented policy of a network device with an object-oriented expression to specify structure in a payload of a packet stream received by a network device is depicted. In brief overview, a configuration interface 700 is provided by a device in order to configure a policy 600 for a network device 200 (step 801). The device receives, via the configuration interface 700, an expression 610 for the policy 600 (step 803). The device receives, via the configuration interface 700 user information identifying an action to be taken based on an evaluation of the expression (step 805).

Still referring to FIG. 8A, now in further detail, a configuration interface may be provided for configuring a policy 600 for a network device 200 in any manner (step 801). In some embodiments the configuration interface 700 may comprise a command line interface. In other embodiments, the configuration interface 700 may comprise a graphical user interface. The configuration interface 700 may comprise one or more of a drag-and-drop interface, a list-selection interface, or a syntax-highlighting interface. In some embodiments, the configuration interface 700 resides on a client device 102. In other embodiments, the configuration interface 700 executes on the network device 200. In some embodiments, a device providing the configuration interface 700 is connected to an appliance 200 by a network 104. In some embodiments, the configuration interface 700 is a webpage. In some other embodiments, the configuration interface 700 is a webpage that resides on the network device 200. In other embodiments, the configuration interface 700 is a webpage that resides on a separate server 106.

A device receives, via the configuration interface 700, an expression 610 for the policy 600 specifying an object class to apply to a portion of the payload of a packet stream and a member of the object class (step 803). In some embodiments, the expression may be received via an expression input screen 500. In one embodiment, the expression 610 identifies a portion of text within a packet stream. In certain embodiments, the expression 610 specifies a protocol, and may also specify one or more methods and fields related to the protocol. For example, the expression may specify a protocol of HTTP, HTML, FTP, SMTP, ICA, and/or SSL. The specified protocol may then be applied to parse a data stream according to the protocol.

The received expression may specify any object class. For example, the received expression may specify any of the object classes described in the object model of FIG. 4A. An object class may be specified in any manner. In one embodiment, specifying an object class may comprise specifying an instance of the object class. For example, the expression "HTTP.REQ" may specify an instance of the "http_request" object from FIG. 4A. In some embodiments, the received expression may comprise an object-oriented expression.

The received expression may also specify any member of an identified object class. The member may comprise any object, data type, or method. In some embodiments, the member comprises a field. In other embodiments, the member may comprise a field corresponding to a second object class. In some embodiments, the member of the object class comprises a method. In some embodiments, the member of the object class is inherited from a parent class of the object class. The member of the object class may correspond to an HTTP request or response. In other cases, a member of the class may be a uniform resource locator ("URL") or a cookie.

In other embodiments, the expression 610 comprises an explicit typecasting. The explicit typecasting may be used to specify an object class to use with respect to a field or returned object. For example, a field containing a number may be explicitly typecast to an alphanumeric string in order to execute a string comparison. Or for example, a stream of bytes may be typecast to a list with a given delimiter. Or for example, a data stream may be typecast as corresponding a particular protocol or protocol object.

A device may receive, via the configuration interface 700, information that identifies an action 615 for the policy 600, the action 615 to be taken based on an evaluation of the expression 610 (step 805). In some embodiments, the action 615 may comprise an object-oriented expression. In certain embodiments, the method performs the action 615 in order to provide load-balancing, content switching, application security, application delivery, network acceleration, or application acceleration. For example, in order to accelerate network activity, the method may evaluate an expression 610 to determine the location of the user and, based on the user's location, route the user's traffic to the geographically closest server or servers 106. In some embodiments, a policy may perform security, acceleration, load-balancing or content switching functions by rewriting a URL in either the HTTP request or response. For example, an action 615 may specify to modify the HTTP request so that the URL refers to a specific server or server farm 106. In some cases, the action 615 received from the configuration interface 700 may be an expression for "no action" or for a default action.

Figure 8B:
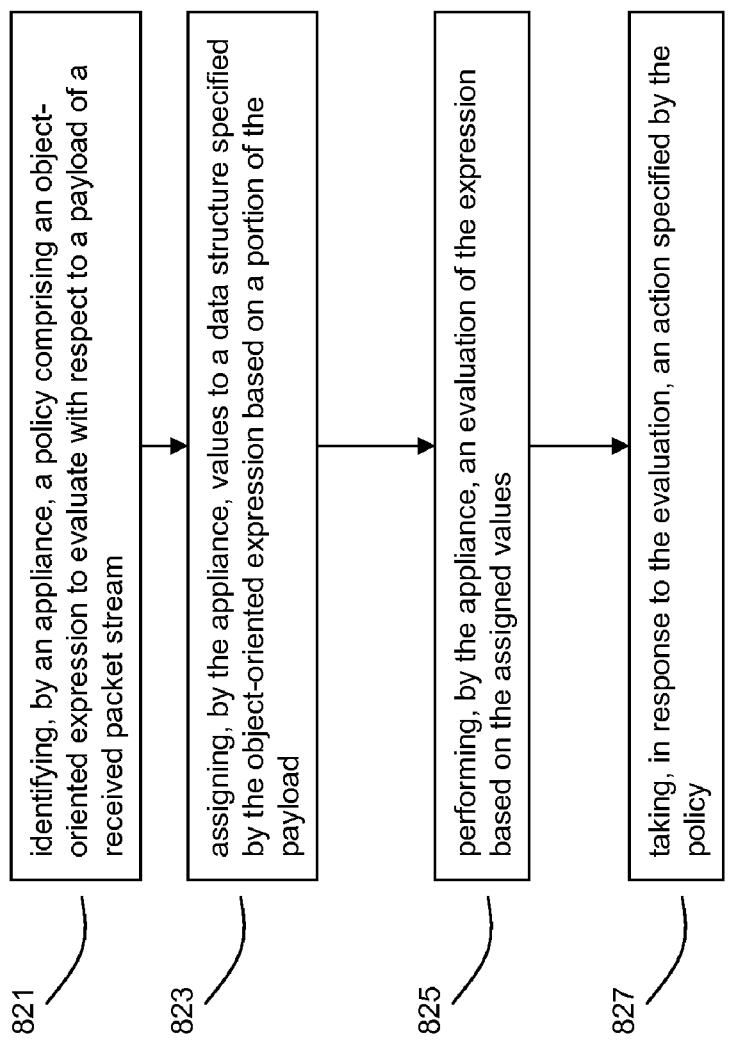
FIG. 8B is a flow diagram of one embodiment of a method for processing an object-oriented expression in a network appliance.

Referring now to FIG. 8B, an embodiment of a method of applying, by a device, object-oriented expressions 610 in a policy 600 to specify a structure in a payload of a packet stream received by an appliance 200 is depicted. In brief overview, an appliance 200 identifies a policy 600 comprising an object-oriented expression 610 to evaluate with respect to a payload of a received packet stream (step 821). The appliance 200 assigns values to a data structure specified by the object-oriented expression 610 based on a portion of the payload (step 823). The appliance 200 performs an evaluation of the expression 610 based on the assigned values (step 825) and takes, in response to the evaluation, an action 615 specified by the policy 600 (step 827).

Still referring to FIG. 8B, now in further detail, an appliance may identify a policy to apply to a data stream any manner (step 821). In some embodiments, an appliance may read a policy from one or more configuration files. In other embodiments, a policy engine 236 in an appliance may store a number of policies in memory. In still other embodiments, an appliance may identify a policy in response to a type or protocol of the data stream. For example, an appliance may have a set of policies applied to all incoming TCP streams. Or for example, an appliance may identify one or more policies that are applied to SSL streams. In one embodiment, an appliance may identify a policy based on a sender or a recipient of a data stream. For example, a VPN appliance may have a set of policies which are applied to incoming connection requests from clients. Or an acceleration device may identify one or more polices to apply to a HTTP stream from a server 106. In some embodiments, the policy may comprise a policy received via a configuration interface 700.

The packet stream may be received in any manner, and from any source. In some embodiments, the packet stream may be transparently intercepted by the appliance. In other embodiments, the appliance may receive the packet stream in the process of proxying one or more transport layer connections. The packet stream may comprise any type of packets including, without limitation, IP packets, TCP packets, UDP packets, and ICMP packets. The packet stream may comprise any other protocol or protocols.

The identified policy may comprise an object-oriented expression to evaluate with respect to the payload of a packet stream. The object-oriented expression may comprise any type of object-oriented expression, and may specify one or more object classes, fields, and methods. In some embodiments, the object-oriented expression may comprise part of a rule. In some embodiments, the expression may specify one or more objects corresponding to a client, server, HTTP protocol, or the appliance.

The object-oriented expression may be evaluated with respect to any payload of a packet stream. In one embodiment, the expression may be evaluated with respect to the payload of a TCP or UDP stream. In another embodiment, the expression may be evaluated with respect to an SSL stream. In still another embodiment, the expression may be evaluated with respect to the payload of an ICA stream. The packet stream may be received from any source including, without limitation, a client, server, client agent, server agent, or a second appliance.

The appliance assigns values to a data structure as specified by the object-oriented expression 610 (step 823). A data structure may comprise the physical representation of an object instance. In some embodiments, the appliance may parse some or all of the received payload to assign the values. In other embodiments, the appliance may perform any methods specified by the expression or included in an object model to assign values. For example, with respect to the expression:

"HTTP.REQ.HEADER("Accept-Language").TYPE-CAST_TO_LIST(",")"

the appliance may assign values to an object corresponding each of the request, header, and comma-delimited list specified. In some embodiments, the assigning of values may comprise determining a portion or portions of the data stream corresponding to an object. In some embodiments, the step 823 includes applying, by the appliance 200, a class specified by the object-oriented expression 610 to a byte stream of the payload. For example, if an expression specifies a URL class, the appliance may assign a value to an underlying URL data structure by determining the starting and ending points of a URL within the received payload. These starting and ending points may then be stored in a URL data structure and used to perform any of the methods in the URL class. In some embodiments, the appliance may assign values to a plurality of data structures specified by the object-oriented expression. In one embodiment, a policy engine 236 may perform any functions related to the evaluation of a policy.

The appliance may perform an evaluation of the expression 610 based on the assigned values in any manner (step 825). In some embodiments, the appliance may use one or more methods of an object class specified by the expression to perform the evaluation. In some embodiments, the evaluation may produce a boolean value. In other embodiments, the evaluation may produce an integer, string, or other object. The appliance may use the assigned values in any manner. In the URL example above, the appliance, after determining a starting and ending point for the URL, may then use those values to perform any operations with respect to the URL. In some embodiments, the appliance may then perform the getSuffix( ) method referenced in FIG. 4A, which identifies a file type suffix of the requested URL. This method may also comprise determining a starting and ending point of the suffix in relation to the starting and ending point of the URL. The appliance may then use the starting and ending points of the suffix to perform any evaluations of the file suffix, such as comparing it to the string ".jsp" to determine if the requested URL corresponds to a Java Server Page.

In some embodiments, the appliance may evaluate a rule comprising the expression. In other embodiments, the appliance may evaluate a rule comprising a plurality of expressions.

The appliance may then, in response to the evaluation, take an action 615 specified by the policy 600 (step 827). In one embodiment, the appliance takes an action if the result of the evaluation is a value corresponding to true. In another embodiment, the appliance may take an action if the result of the evaluation is non-zero. The action taken may be any action including, without limitation, any action relating to load-balancing, content switching, application security, application delivery, network acceleration, or application acceleration. In some embodiments, the action 615 may comprise a "no action."

In some embodiments, the appliance may perform the action immediately following the evaluation. In other embodiments, the appliance may perform the action subsequent to evaluating at least one other policy. In still other embodiments, the appliance may perform the action after waiting a predetermined amount of time or waiting until a resource becomes available. In one embodiment, the appliance may perform the action after receiving additional portions of the packet stream.

In some embodiments, the appliance may then forward the received packet stream to one or more appliances servers, clients, or client agents. The appliance may perform any other network appliance functions with respect to the packet stream including, without limitation, acceleration, compression, and load balancing.

Figure 8C:
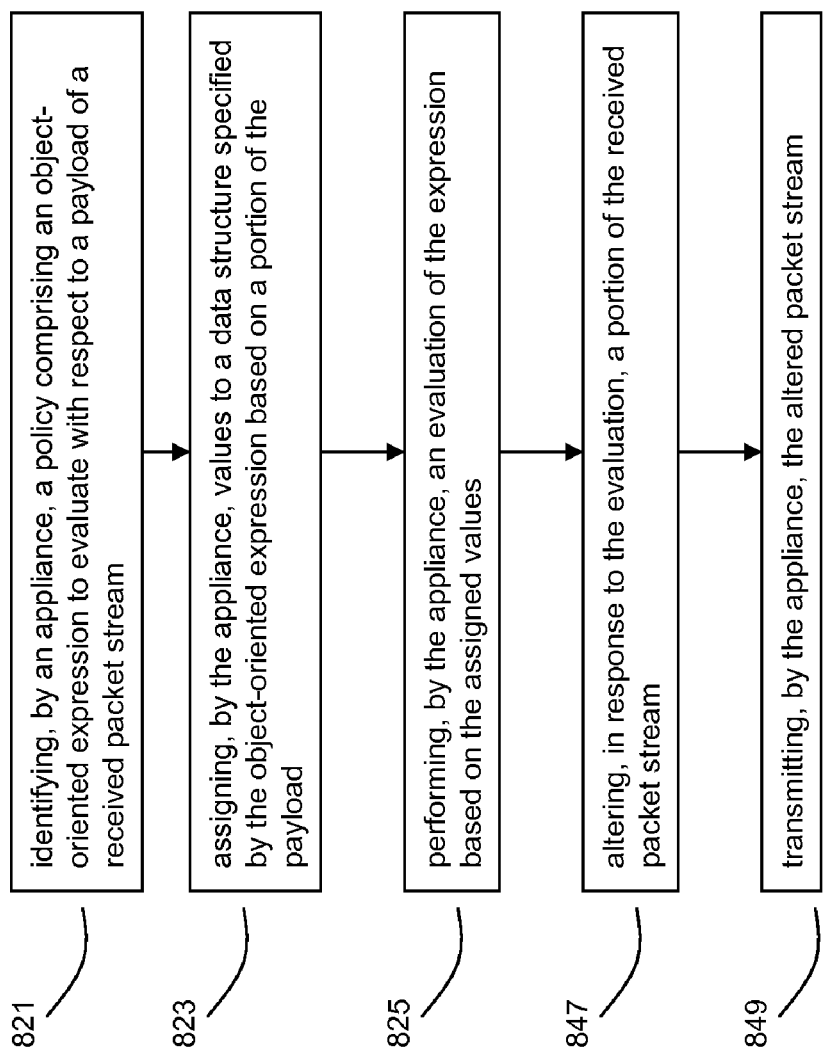
FIG. 8C is a low diagram of one embodiment of a method for using object-oriented expressions to rewrite portions of a received packet stream.

Now referring to FIG. 8C, a method, in an appliance 200, for applying object-oriented expressions 610 in a policy 600 to specify structure in a payload of a packet stream received by the appliance 200 is shown. In brief overview, the appliance identifies a policy 600 including an object-oriented expression 610 to evaluate with respect to a payload of a received packet stream (step 841). The appliance assigns values to a data structure specified by the object-oriented expression 610 based on a portion of the payload (step 843). The appliance also performs an evaluation of the expression 610 based on the assigned values (step 845). In response to the evaluation, the appliance alters a portion of the received packet stream (step 847) and transmits the altered packet stream (step 849).

Still referring to FIG. 8C, now in greater detail, the appliance may identify a policy 600 that specifies an object-oriented expression 610 to evaluate with respect to a payload of a received packet stream (step 821). This step may be performed in any manner described herein.

The appliance may assign values to a data structure specified by the object-oriented expression 610 based on a portion of the payload in any manner (step 823). This step may be performed in any manner described herein.

The appliance performs an evaluation of the expression based on the assigned values (step 845). This step may be performed in any manner described herein.

In response to the evaluation, the appliance may alter a portion of the received packet stream (step 847). In some embodiments, altering a portion of the received packet stream may comprise taking an action in response to the evaluation (step 827). In some embodiments, the portion of the packet stream that is altered is specified by a data structure identified by the object-oriented expression. In other embodiments, the portion of the packet stream that is altered is specified by a second object-oriented expression. In some embodiments, the portion of the packet stream to be altered may be specified by an object-oriented expression in an action of the policy. In some embodiments, the appliance may rewrite a URL in the body of an HTTP response or request. In other embodiments, the appliance may rewrite a form field value in the packet stream. The form field that is altered may be a field in an HTTP request, an HTTP response or any other field in an object that is part of the packet stream. In still another embodiment, the appliance may alter one or more name-value pairs contained in the packet stream. In some embodiments, the appliance may rewrite a portion of the received packet stream to obscure or remove confidential data including, without limitation, personal identification numbers, checking account routing numbers, personal contact information, social security numbers, passwords and other confidential information.

To give a detailed example, upon receiving an HTTP stream from a client destined to a server, an appliance providing application security functions for the server may determine to apply a policy:

if (HTTP.Request.getCookie( ).getValue("username").length>20) then HTTP.Request.getCookie( ).setValue("username", "void")

In this example the appliance may parse some or all of the HTTP stream to identify the portion of the stream containing the request, and then the cookie within the request. The appliance may do this in any manner, including maintaining one or more internal data structures with references pointers pointing to the areas of the stream corresponding to the request and cookie. The appliance may then identify the value of a "username" name-value pair within the cookie and determine the whether the length of the value is greater than 20 characters. A length of over 20 characters may indicate an application error or a malicious attack, such as an attempted buffer overflow attack. Upon determining the length is greater than 20 characters, the appliance may then alter the value to "void" or any other signal which may notify the server receiving the stream that an inappropriate value was sent by the client. The appliance may use and/or modify any internal data structures in order to alter the stream. The appliance may then forward the altered stream to the server. In other embodiments, the appliance may simply block the stream from reaching the server upon detecting the potential overflow. In these embodiments, the appliance may return an error message to the client.

In another embodiment, the appliance may replace an entire HTTP response with a new response. For example, if the appliance determines that a response contains confidential data in a form, the appliance may replace the response with a response indicating an error or with a response comprising neutral content. In yet another embodiment, an appliance may replace or rewrite an entire HTTP request or response header.

The appliance may then transmit the altered packet stream in any manner (step 849). In some embodiments, the appliance may forward the altered packet stream to a server or client designated as the recipient of the stream. In other embodiments, the appliance may redirect the stream to an appliance, server or client other than the intended recipient of the stream. The appliance may transmit the altered packet stream using any protocol or protocols including, without limitation, TCP, IP, UDP, SSL, and ICA.

E. Systems and Methods for Handling Undefined Policy Expressions

Referring now to FIG. 9, an embodiment of a method, in an appliance 200, for applying a policy 600 specifying an action 615 to be taken in the event an element of the policy 600 is undefined is shown. In brief overview, an appliance identifies a policy 600 to evaluate with respect to a payload of a received packet stream, where the policy 600 specifies (i) an expression 610, (ii) a first action 615 to take based on the expression 610 and (iii) a second action 610 to take if an element is undefined (step 901). The appliance determines that an element of the policy 600 is undefined with respect to the payload (step 903). In response to its determination that an element is undefined, the appliance takes the second action (step 905). Broadly speaking, the method allows a policy to specify an action to be taken if an error or exception is encountered when the appliance attempts to evaluate the policy. In this manner, the second action may be a fallback or error-handling method.

Still referring to FIG. 9, now in greater detail, an appliance identifies a policy 600 to evaluate with respect to a payload of a received packet stream, where the policy 600 specifies an expression 610, a first action 615 to take based on the expression 610 and a second action 610 to take if an element of the policy is undefined (step 901). The appliance may identify the policy in any manner. In one embodiment, the expression may be an object-oriented expression. In another embodiment, the expression 610 may identify an object class to apply to a portion of the payload of a packet stream and a member of the object class. In another embodiment, the expression 610 specifies a protocol, and may also specify one or more related methods and fields. The expression may identify any type of object and/or object class. In some embodiments, the expression may comprise one or more methods of an object class.

The packet stream may be received in any manner and from any source. In some embodiments, the packet stream may be transparently intercepted by the appliance. In other embodiments, the appliance may receive the packet stream in the process of proxying one or more transport layer connections. The packet stream may comprise any type of packets including, without limitation, IP packets, TCP packets, UDP packets, and ICMP packets. The packet stream may comprise any other protocol or protocols.

The first action specified by the policy may comprise any action. In some embodiments, the first action may comprise an action to be performed if the expression or a rule containing the expression evaluates to true. In some embodiments, the action 615 may relate to load-balancing, content switching, application security, application delivery, network acceleration, or application acceleration. In other embodiments, either action 615 may comprise to a "no action" or a default action.

The second action specifies an action to be taken if an element of the policy is undefined. An element of the policy may comprise any portion of the policy including, without limitation, one or more expressions, rules, or operators. An element may be undefined in any circumstance where an appliance cannot successfully assign a value to the element. In one embodiment, an element may be undefined if the element results in a comparison of incompatible types such as, for example, determining whether an integer is greater than a list, or a boolean value is equal to a string. In other embodiments, an element may be undefined if the element results in one or more null values. For example, if an expression attempts to access a "username" value within a URL object and the expression is applied to a data stream with a URL with no username value specified, an operation with respect to the username may be undefined. In other embodiments, an element may be undefined as a result of one or more improper typecasts.

In some embodiments, the second action may have been specified by a user via a configuration interface. For example, upon entering or viewing a policy in the configuration interface, a user may be prompted to enter an action to be taken if the policy is undefined at runtime. In other embodiments, the second action may comprise a preconfigured default second action. For example, a group of policies may have a default action to take in the event of an undefined element. For example, a group of policies enabling URL rewriting may have a default second action of not rewriting any URLs. Or a group of policies for performing load balancing may have a default second action of forwarding the packet stream to a designated backup server.

The appliance 200 may determine if an element of the policy 600 is undefined with respect to the payload in any manner (step 903). In some embodiments, the appliance may determine that the policy is undefined in the process of evaluating the policy. In other embodiments, the appliance may determine that the policy is undefined in the process of precompiling, compiling or interpreting the policy. In some embodiments, the appliance may determine the policy is undefined by detecting one or more exceptions generated during the evaluation of the policy. For example, the appliance may detect a null pointer, overflow, or arithmetic processing exception during the evaluation of the policy.

In response to the determination that an element is undefined, the appliance may take the second action (step 905). The second action may comprise any action described herein. In some embodiments, the second action may comprise terminating the receipt and or transmission of the packet stream. In other embodiments, the second action may comprise no action.

F. Systems and Methods for Configuring and Using Policy Groups

Figure 10A:
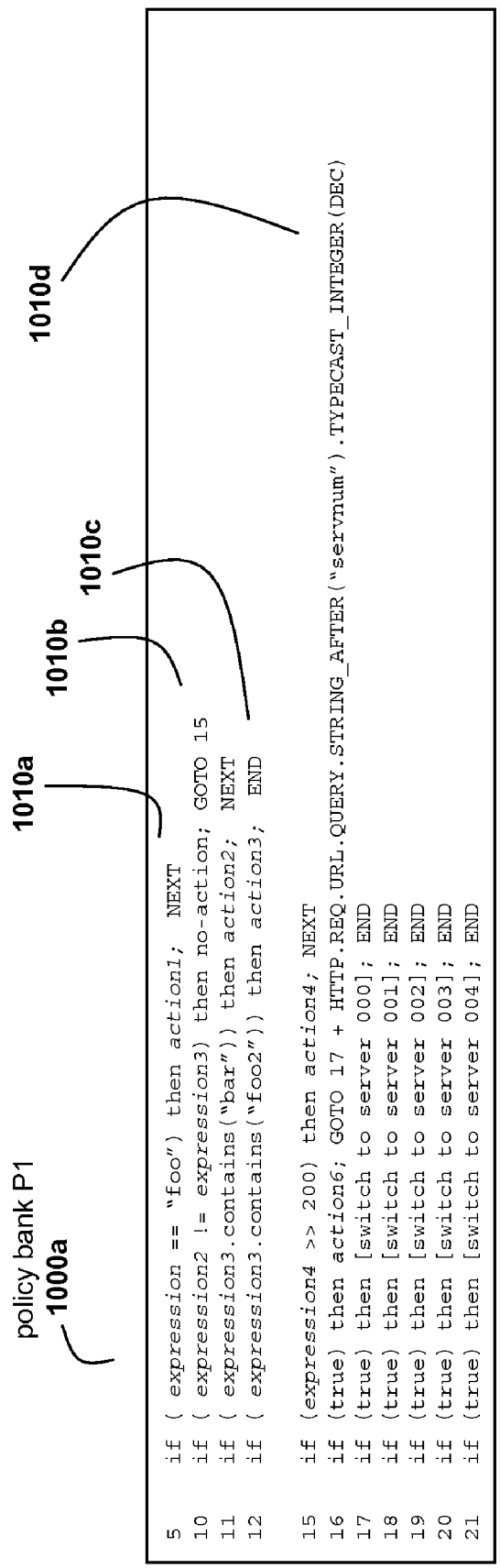
FIG. 10A is a diagram of an example of one embodiment of a policy bank.

Referring now to FIG. 10A, an example of a policy bank is shown. In brief overview, a policy bank 1000*a* comprises a group of one or more policies with a specified order for evaluation. In the example shown, the order is specified by line numbers for each of the policies. Each policy may also have a flow instruction 1010a, 1010b, 1010c, 1010d (generally 1010) indicating a policy to be evaluated after evaluation of the current policy.

Still referring to FIG. 10A, now in greater detail, a policy bank 1000 may comprise any number of policies including, without limitation, 1, 2, 3, 4, 5, 6, 10, 20, 50, and 100 policies. The policies of a policy bank may comprise any policies described herein. In some embodiments, a policy bank may comprise a group of policies performing a common function. For example, a policy bank may comprise a group of policies providing load balancing functions. Or for example, a policy bank may comprise a group of all the policies for providing caching.

A policy bank may be configured in any manner. In some embodiments, a configuration interface 700 may be provided which allows a user to create and group one or more polices. In some embodiments, a configuration interface may be provided which allows a user to name a given policy bank. In other embodiments, a configuration interface may be provided which allows a user to specify one or more attributes of a policy bank. For example, a policy bank may have a default action to perform in the event of an exception or undefined policy. Or, for example, a policy bank may have a set of circumstances in which the policy bank is applied. For example, a user may specify that a policy bank is to be used with respect to all incoming HTTP traffic. Or, for example, a user may specify a policy bank to be used upon receiving any connection requests from new devices. In other embodiments, a policy bank may comprise a set of attributes which are used to enforce certain characteristics in the policies of the policy bank. For example, a policy bank may require that no policies in the policy bank access a certain object. The attributes of a policy bank may be enforced at configuration time or at runtime.

A policy bank may be stored in any manner. In some embodiments, a policy bank may be stored on a file in an appliance. In other embodiments, a policy bank may be stored in a policy engine 236 of an appliance.

A policy bank may comprise any means of ordering policies for evaluation. In one embodiment, a policy bank may comprise an ordered list of policies. In other embodiments, a policy bank may comprise a set of policies with one or more flow instructions 1010 indicating an evaluation order. In still other embodiments, a policy bank may comprise a numbered list of policies to be executed in order of increasing numbers.

Each expression in a policy bank may specify a flow instruction 1010. A flow instruction 1010 may comprise any information or expression indicating a policy to be executed in the event the policy containing the flow instruction evaluates to true. In one embodiment, a flow instruction may comprise a "NEXT" statement 1010a, which indicates that the next policy in the bank should be evaluated. In another embodiment, a flow instruction may comprise a "GOTO" statement 1010b which identifies another policy in the policy bank to be evaluated next. In some embodiments, a GOTO statement may identify a policy by a line number. In other embodiments, a GOTO statement may identify a policy by a policy name or other identifier. In still another embodiment, a flow instruction may comprise an "END" statement, which indicates that no more policies of the policy bank should be evaluated.

In some embodiments, a flow instruction 1010d may comprise an expression or expression to be evaluated to determine the policy to be executed next. A flow instruction may comprise any expression including, without limitation, any object-oriented expression. For example, the flow instruction 1010d specifies that an integer following a "servnum" portion of a query should be added to 17 to determine the line of the policy to be executed next. In the example policy bank, the flow instruction 1010d may be used to distribute HTTP requests among a number of servers based on a parameter in the requests.

In some embodiments, a configuration interface 700 may be provided with means for a user to order policies within a policy bank. The configuration interface may allow a user to specify line numbers, priorities, list ordering, or any other means of specifying evaluation order. In some embodiments, a configuration interface 700 may allow a user to specify one or more flow instructions with respect to a policy or a policy bank. In other embodiments, the configuration interface may also provide any input means for entering one or more flow instructions corresponding to policies in the policy bank.

Figure 10B:
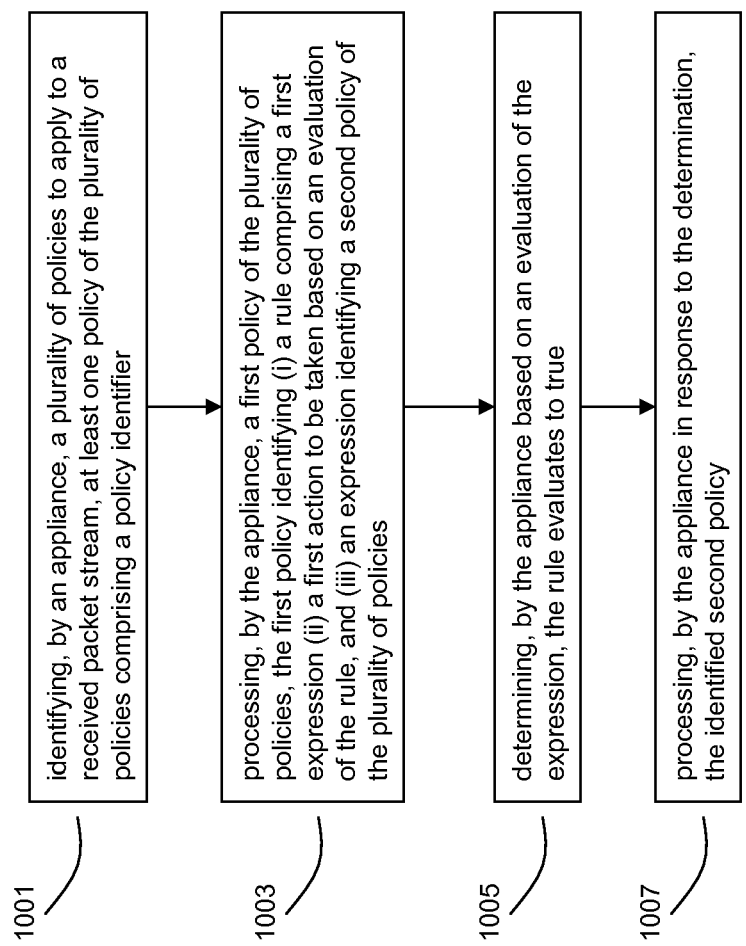
FIG. 10B is a flow diagram of one embodiment for controlling processing order in a group of policies.

Referring now to FIG. 10B, an embodiment of a method of flow control among policies 600 used in a network device 200 processing a packet stream is shown. In brief overview, the method includes identifying, by an appliance 200, a plurality of policies 600 to apply to a received packet stream, where at least one of the policies 600 includes a policy identifier (step 1001). The appliance processes a first policy 600 of a plurality of policies 600, the first policy 600 identifying (i) a rule 605 that includes a first expression 610 (ii) a first action 615 to be taken based on an evaluation of the rule 605, and (iii) a second policy 600 from among multiple policies (step 1003). Based on an evaluation of the expression 610, the appliance determines that the rule 605 evaluates to true (step 1005). In response to the determination, the appliance 200 processes the identified second policy 600 (step 1007).

Still referring to FIG. 10B, now in further detail, the appliance identifies a plurality of policies 600 to apply to a received packet stream where at least one of the plurality policies specifies a policy identifier (step 1001). The appliance may identify the plurality of policies in any manner. In some embodiments, the appliance may identify that the plurality of policies corresponds to policies for a given data stream, data stream source, or data stream recipient. In one embodiment, the plurality of policies may comprise a policy bank.

The packet stream may be received in any manner and from any source. In some embodiments, the packet stream may be transparently intercepted by the appliance. In other embodiments, the appliance may receive the packet stream in the process of proxying one or more transport layer connections. The packet stream may comprise any type of packets including, without limitation, IP packets, TCP packets, UDP packets, and ICMP packets. The packet stream may comprise any other protocol or protocols.

The at least one policy identifier may comprise any means of identifying a policy, including, without limitation, a line number, policy name, or priority number. In some embodiments, each policy 600 of the multiple policies 600 specifies a ranking indicating a default order in which the policies 600 should be processed.

The appliance 200 processes a first policy 600 of the plurality of policies 600 in which the first policy 600 identifies a rule 605 that specifies a first expression 610, a first action 615 to be taken based on the evaluation of the rule 605, and an expression 610 identifying a second policy 600 of the plurality of policies 600 (step 1003). The first policy may be processed in accordance with any method for evaluating and processing a policy. In some embodiments, the first policy may comprise an object-oriented expression. In other embodiments, the first policy may comprise a rule comprising an object-oriented expression.

The first policy may contain any expression identifying a second policy. In some embodiments, the first policy may comprise a name of a second policy. In other embodiments, the first policy 600 includes an integer that specifies the ranking of a second policy 600 to be processed next if the first action 615 applies.

In some embodiments, the first policy may comprise a flow instruction 1010. The first policy may comprise any flow instruction, including "next," "goto," or "end." The first policy may comprise any other elements including, without limitation, an action to be performed if an element of the first policy is undefined. In one embodiment, each policy of the plurality of policies may comprise a flow instruction.

Based on the evaluation of the expression 610 by the appliance 200, the appliance determines the rule 605 evaluates to true (step 1005). In some embodiments, this step includes evaluating an object-oriented expression 610.

In response to the determination that the rule evaluates to true, the appliance 200 may process the identified second policy 600 (step 1007). In one embodiment, step 1007 may comprise executing a flow instruction specified by the first policy. In some embodiments, the appliance 200 may evaluate an expression 610 to determine a ranking of a second policy 600 from among the multiple policies 600 to be processed next. In some other embodiments, the appliance 200 may evaluate an object-oriented expression 610 to determine a ranking of a second policy 600 among the multiple policies 600 to be processed next. For example, the appliance may evaluate an expression to determine a line number to be used in conjunction with a GOTO flow instruction. After determining the line number, the appliance may then process the policy at the given line number.

In some embodiments, the appliance may also take the action specified by the first policy upon determining the rule is true. In other embodiments, upon determining the rule is true, the appliance may store the action specified by the first policy in a list. This list may be used to store a number of actions to be taken. In one embodiment, as an appliance processes a number of policies in a policy bank, the appliance may store a list of actions for each policy that contained a rule that evaluated to true. After processing the number of policies, the appliance may then take all of the actions stored in the list. In another embodiment, as an appliance processes a plurality of policy banks, the appliance may store a list of actions for each policy that contained a rule that evaluated to true. After processing the number of policy banks, the appliance may then take all of the actions stored in the list.

Figure 11A:
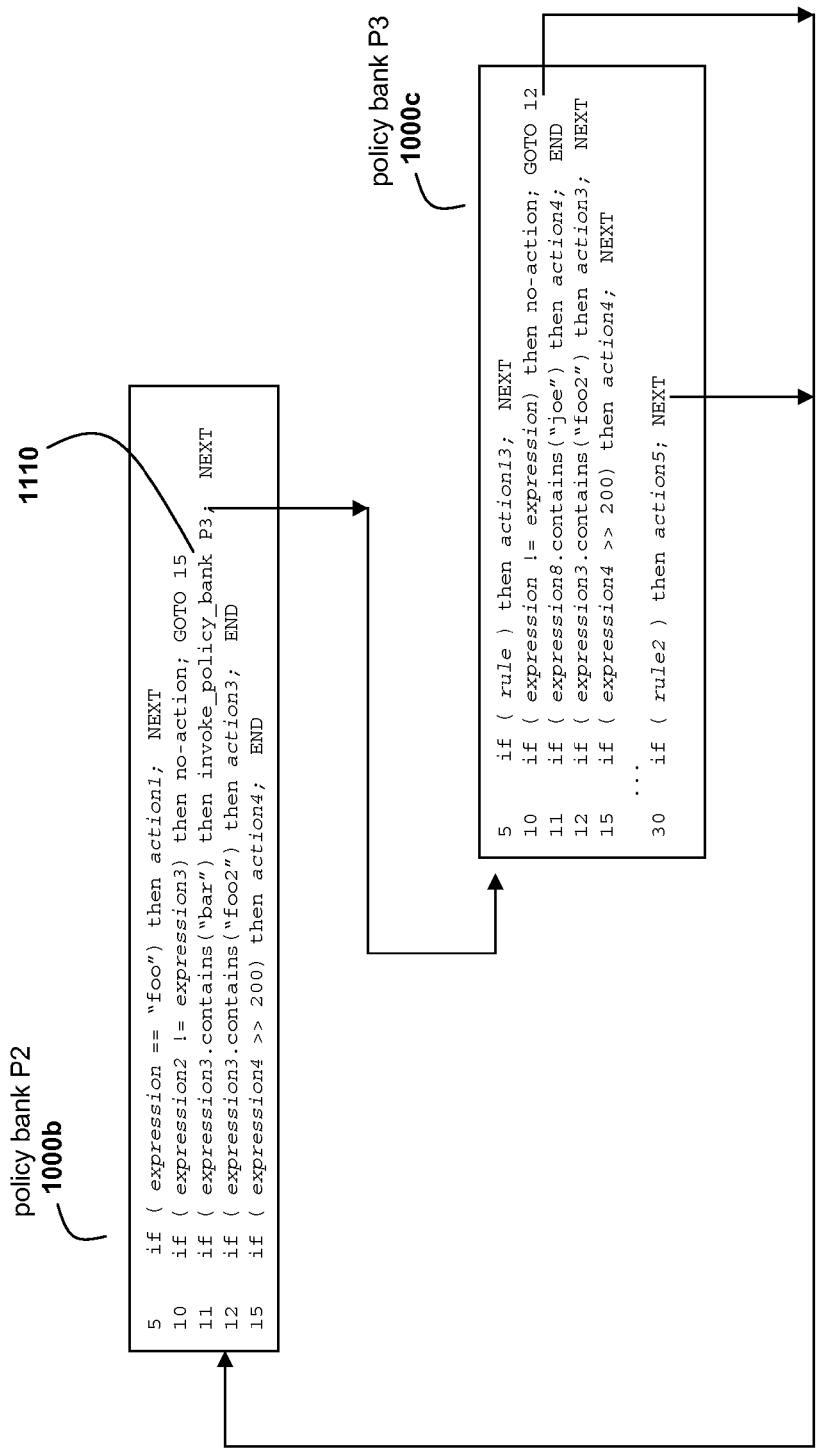
FIG. 11A is a block diagram of one embodiment of controlling processing order among a plurality of policy groups.

Referring now to FIG. 11A, a block diagram illustrating flow control among a plurality of policy groups is shown. In brief overview, a policy bank 1000b comprises a number of policies. One of the policies comprises an invocation action 1110 which invokes a second policy bank 1000c. The invocation action 1110 indicates a policy bank 1000c to be processed if the rule of the policy containing the action evaluates to true. After processing the invoked policy bank, an appliance may then resume processing the first policy bank 1000b. This processing will be further described with respect to FIG. 11B.

Still referring to FIG. 11A, a configuration interface 700 may be provided which allows a user to specify an order of execution among policy groups by including one or more invocation actions 1110. An invocation action may identify a policy group in any manner including, without limitation, by name, by memory location, or by any other identifier. In some embodiments, the policy groups may comprise policy banks. In still other embodiments, an invocation action 1110 may specify a specific policy within a second policy bank.

In some embodiments, an invocation action 1110 may include one or more directives indicating how the second policy group is to be processed. In one embodiment, an invocation action 1110 contained in a first policy bank may specify whether or not processing of the first policy bank should be resumed after processing the invoked policy bank. In another embodiment, an invocation action 1110 may specify whether or not processing of the first policy bank should be resumed if a hard stop or exception is encountered in the invoked policy bank. For example, an invocation action may specify that if an "END" flow instruction is encountered in the second policy bank, that processing should resume with the first policy bank. Or an invocation action may specify that if an exception or "END" flow instruction is encountered in the second policy bank, that no more policies of the first policy bank should be processed.

In this manner, a user may configure a number of policy banks to ensure that certain policies are processed, even where the results of one or more policy banks are uncertain. For example, a policy bank providing policies for denying access to restricted URLs may invoke a policy bank for providing SQL security upon detecting that a URL indicates that a request contains SQL queries. The invocation may specify that regardless of the outcome of the SQL security policy bank processing, processing should resume at the URL module after the processing of the SQL policy bank. In this manner, the user may be assured that all of the restricted URL enforcement policy bank are executed, which may ensure that all restricted URLs are blocked.

A user may also use policy bank invocation actions 1110 to ensure that policies are not evaluated in the event a given policy bank encounters an exception or hard stop. For example, a policy bank providing content switching policies may, after determining an application corresponding to a request, may invoke a policy bank containing application security policies for the application. The invocation may indicate that if the application security policy bank encounters an "END" instruction, no more policies are to be evaluated in the content switching policy bank. This may be used in cases where an "END" instruction in the application security policy bank indicates that a security requirement has not been met, and thus no more processing of the request should be done.

In some embodiments, an appliance may be configured with one or more default execution orders for policy groups. For example, an appliance might have one or more global policy groups which are always applied first, followed by one or more appliance or vServer specific policy groups which are processed following the global policy groups. In some embodiments, policy banks may have a default ordering responsive to the functions the policy banks perform. For example, a policy bank of SSL policies may be applied first to incoming traffic, and then a set of security policies may be to the decrypted traffic, followed by a bank of content switching policies.

Referring now to FIG. 11B, an embodiment of a method of flow control among policy groups used in a network device 200 processing a packet stream is shown. In brief overview, an appliance identifies a first policy group to apply to a received packet stream (step 1101). The appliance processes a first policy of the first policy group, where the first policy identifies (i) a rule 605 specifying a first expression 610, and (ii) information identifying a second policy group (step 1103). The appliance evaluates the rule 605 (step 1105). In response to the evaluation of the rule 605, the appliance processes the identified second policy group (step 1107). After processing the second policy group, the appliance processes a second policy 600 of the first policy group (step 1109).

Still referring to FIG. 11B, now in greater detail, an appliance may identify a first policy group to apply to a received packet stream in any manner (step 1101). The packet stream may be received from any source and may comprise any protocol or protocols.

In some embodiments, the first policy may comprise an object-oriented expression. In other embodiments, the first policy may comprise a rule including at least one expression and/or object-oriented expression. In some embodiments, the first policy 600 specifies an action 615 to be taken based on an evaluation of the rule 605.

The information identifying a second policy group may comprise any form of identifying information. In one embodiment, the second policy group may comprise a policy bank, and the identifying information may comprise a name of the policy bank. In some embodiments, the information identifying the second policy bank may comprise an invocation action 1110.

The appliance may process the first policy 600 in any manner (step 1103). The appliance may evaluate one or more object oriented expressions in processing the policy.

The appliance 200 may evaluate the rule 605 in any manner (step 1105). In some embodiments, the appliance may evaluate an object-oriented expression 610. In some embodiments, the appliance may determine a boolean value corresponding to the rule.

In response to the evaluation of the rule 605, the appliance processes the identified second policy group (step 1107). In some embodiments, the appliance may only process the second policy group if the rule evaluates to true. In other embodiments, the appliance may only process the second policy group if the rule evaluates to a non-zero value. The appliance may process the second group in any manner. In some embodiments, the appliance may process the second policy bank beginning with a specific policy identified by an invocation action 1110.

In some embodiments, after processing the second policy group, the appliance may process a second policy of the first policy group. For example, in FIG. 11A, an appliance may evaluate the policy of line 11 in the policy bank 1000*b*. If the rule is true, the appliance may take the invocation action 1110, and the appliance may process policy bank 1000*c*. After completing the processing of policy bank P3, the appliance may return to the policy bank 1000*b* and process the next instruction, which is line 12. In some embodiments, the appliance may only resume processing the first policy bank if the second policy bank results in a soft stop, such as where the last instruction of a policy bank points a NEXT instruction, as in line 30 of policy bank 1000*c*. In other embodiments, the appliance may resume processing of the first policy bank even where a hard stop is indicated, such as line 11 of policy bank 1000*c*.

In some embodiments, the second policy group may also contain one or more invocation actions. In these embodiments, policy bank evaluations may be chained in any manner. In some embodiments, an appliance 200 may process a third policy group, where the third policy group is identified by a policy 600 in the second policy group. In other embodiments, the first policy bank may have a plurality of invocation actions 1110. In these embodiments, the appliance may process a third policy group, where the third policy group is identified by a second policy 600 of the first policy group. In still other embodiments, the first policy 600 specifies a second policy 600 of the first policy group to be processed after the second policy group is processed. For example, a policy comprising an invocation action 1110 may also comprise a flow instruction which specifies a policy of the first policy group to be processed after processing returns from the second policy group.

G. Systems and Methods for Configuring and Using Application Security Profiles

Figure 12:
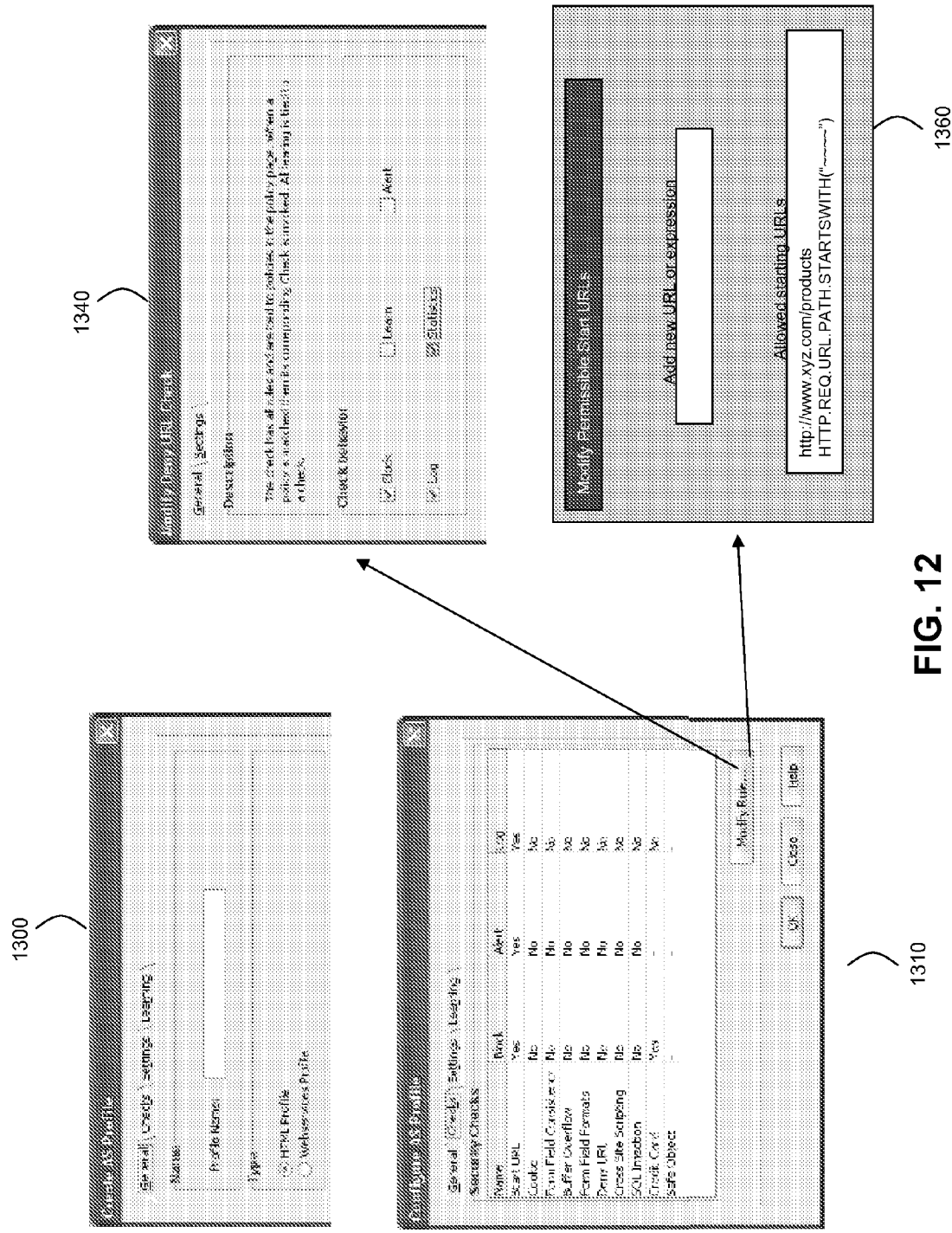
FIG. 12 illustrates a number of example configuration screens which may be used to configure an application security profile.

Referring now to FIG. 12, a number of configuration screens 1200, 1210, 1260, 1240 for configuring an application security profile are shown. In brief overview, a profile creation screen 1200 allows a user to input a name and general properties for a new application security profile. A profile configuration screen 1210 allows a user to select one or more checks contained within a profile. Two check configuration screens 1240, 1260 may then allow a user to modify settings of an individual check.

Still referring to FIG. 12, now in greater detail, a creation screen 1200 allows a user to input a profile name and additional information relating to the profile. A profile may be named in any manner. In some embodiments, a profile name may reflect the function or functions of the profile. Any additional information may be specified along with the profile. In one embodiment, the profile may specify information about the type of network traffic the profile applies to. For example, the profile may apply to HTTP or HTML traffic. Or the profile may apply to webservices traffic.

A profile configuration screen 1210 may allow a user to specify one or more checks to use with the profile. A check may comprise any set of policies or actions related to a common security function. For example, a cookie check may comprise a set of policies, settings or actions to prevent cookie tampering. Or a credit card check may comprise a set of policies, settings, or actions to prevent against confidential credit card information being transmitted via a device. In the embodiment shown, a user is given a choice to block, alert or log with respect to a given check. If "block" is selected, the profile may block all traffic which does not satisfy the check. If "alert" is selected, an administrator or user may receive an alert if a packet stream does not satisfy the check. If "log" is selected, a log entry may be created each time a packet stream is transmitted through a device that does not comply with the check. The profile configuration screen may provide the option to modify any of these checks and rules. In some embodiment, any modifications to a check may be translated into an underlying policy expression used to configure a network device.

A check configuration screen 1240, 1260 may comprise any input means for modifying a check. In one embodiment, a user may be able to specify one or more policies to be included in a check. In another embodiment, a user may be able to modify one or more settings of the check. A setting of a check may comprise any information used by the check in determining whether a traffic stream satisfies the check. For example, with respect to a check that validates starting URLs, a setting may comprise one or more allowed starting URLs. Or for example, for a form field format check, a setting may comprise one or more addresses for which the format check should be applied. In some embodiments a setting may correspond to one or more elements of an underlying policy. For example, an allowed starting URL may be incorporated as an expression in the rule of a policy having an action that allows the traffic to pass.

Figure 13A:
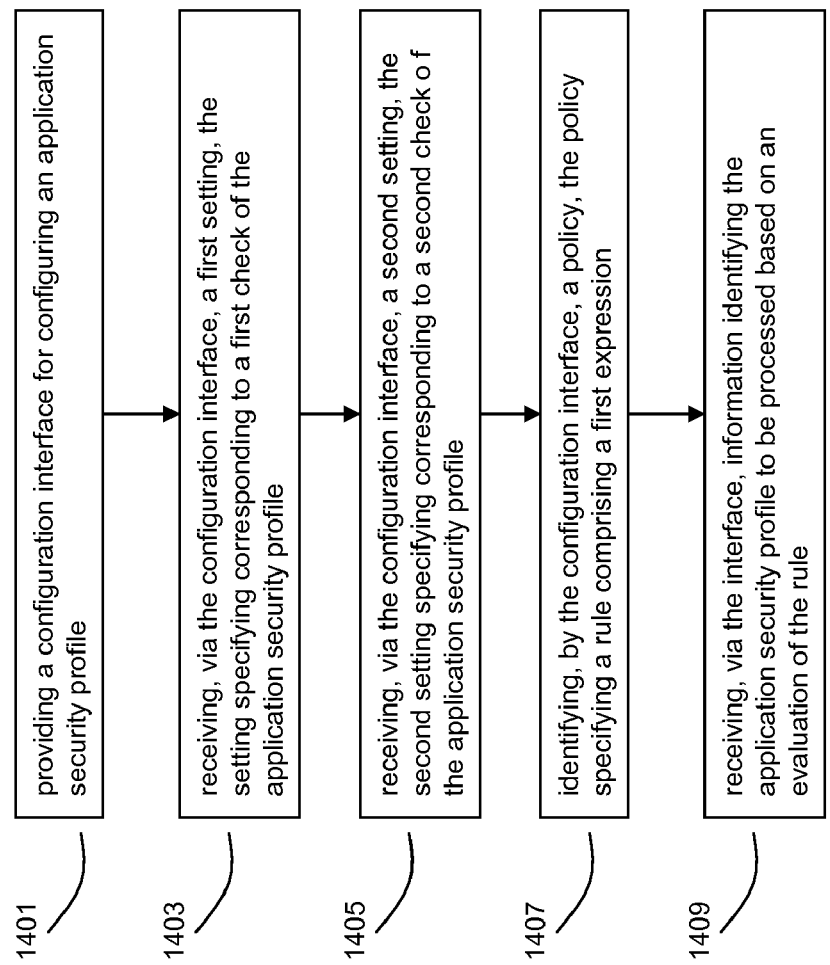
FIG. 13A is a flow diagram of one embodiment of a method for configuring an application security profile.

Referring now to FIG. 13A, a flow diagram of a method for configuring one or more application security profiles for a device, where each application security profile specifies a number of checks to perform security functions related to an application is shown. In brief overview, the method comprises providing a configuration interface for configuring an application security profile (step 1301). The method comprises receives a first setting, via the configuration interface, which corresponds to a first check of the application security profile (step 1303). The method also comprises receiving, via the configuration interface, a second setting, which corresponds to a second check of the application security profile (step 1305). The method also comprises identifying a policy 600 that specifies a rule 605 that includes a first expression 600 (step 1307). The method may then comprise receiving information identifying an application security profile to be processed based on an evaluation of the rule 605 (step 1309).

Still referring to FIG. 13A, now in further detail, a configuration interface is provided for configuring an application security profile (step 1301). The configuration interface may comprise any configuration interfaces, components, and methods described herein. In some embodiments, the configuration interface comprises one or more of a drag-and-drop interface, a list-selection interface, or a syntax-highlighting interface. In other embodiments, the configuration interface may comprise an expression configuration screen 600. In still other embodiments, the configuration interface may comprise any number of profile creation screens 1300, check configuration screens 1310, and/or setting configuration screens 1340, 1360. In still other embodiments, the configuration interface 700 is a command line interface. The configuration interface may execute on any device. In some embodiments, the method includes executing the configuration interface 700 on a device in communication with a network device 200. In other embodiments, the method includes executing the configuration interface 700 on the network device 200. In one embodiment, the method provides a user with a configuration interface 1300 for creating a plurality of application profiles.

A device may receive, via a configuration interface, a first setting that specifies a corresponding first check of the application security profile (step 1303). In some embodiments, the device receives from the configuration interface 700 a URL to be used by the first check. In other embodiments, the device receives from the configuration interface 700 an expression 610 specifying one or more URLs to be used by the first check. In still other embodiments, the device receives from the configuration interface 700 an object-oriented expression 600 specifying one or more URLs to be used by the first check. In some embodiments, the setting may comprise an indication whether the check should block, log, or generate an alert with respect to a packet stream that violates the check. In other embodiments, the setting may comprise an element of one or more policies included in the check.

The device also receives, via the configuration interface 700, a second setting that specifies a corresponding second check of the application security profile (step 1305 This setting may be received in any manner, including any manner in which the first setting was received.

The device may identify, via the configuration interface 700, a policy 600 that specifies a rule 605 which includes a first expression 610 (step 1307). In some embodiments, the policy may comprise an object-oriented expression. The policy may be identified in any manner. In some embodiments, the policy may be chosen from a list. In other embodiments, the policy may be chosen via a drag-and-drop interface. In still other embodiments, the policy may be automatically chosen with respect to a given profile. In one embodiment, the policy may be input directly by a user.

The device may receive, via the interface 700, information that identifies the application security profile to be processed based on an evaluation of the rule 605 (step 1309). In one embodiment, the application security profile may be represented as a policy bank, and an invocation action may be added to the policy identifying the policy bank. In some embodiments, the method includes storing the application security profile. In other embodiments, the method includes transmitting the application security profile to a network device 200.

In some embodiments, an application security profile may be specified as an action for more than one policies. For example, there may be several conditions under which an application security profile including form field consistency and buffer overflow checks should be applied. A plurality of policies, each specifying one of the several conditions, each may invoke the application security profile as an action.

Figure 13B:
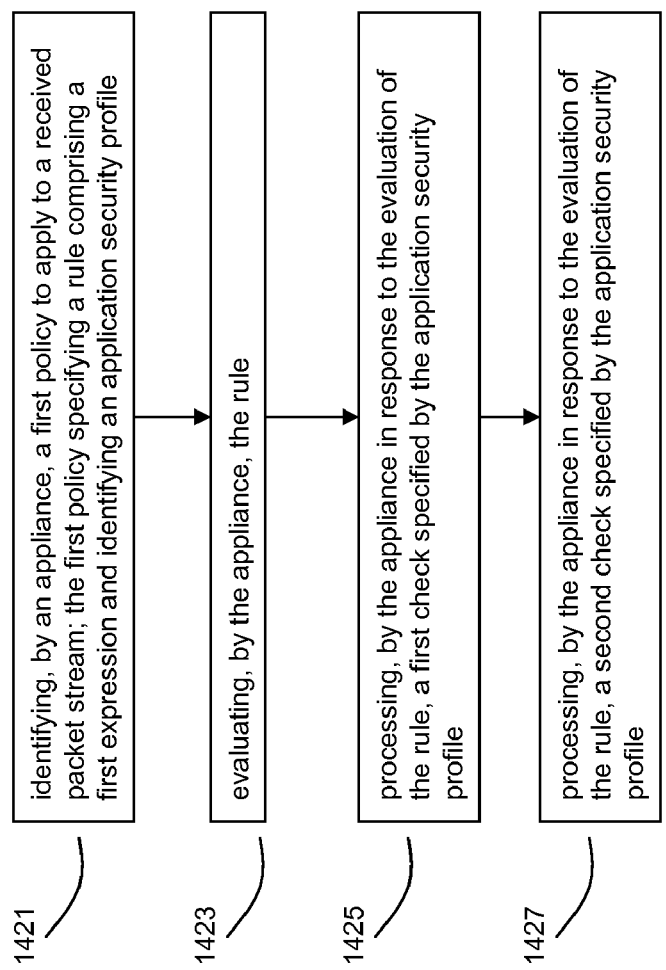
FIG. 13B is a flow diagram of one embodiment of a method for processing an application security profile.

Referring now to FIG. 13B, an embodiment of a method for executing one or more application security profiles for a device, each application security profile specifying a number of policy groups performing security functions related to an application is shown. In brief overview, the method includes an appliance identifying a first policy to apply to a received packet stream; where the first policy 600 specifies a rule 605 that includes a first expression 610 and identifies an application security profile (step 1321). The appliance 200 evaluates the rule 605 (step 1323). The appliance, in response to the evaluation of the rule 605, processes a first check specified by the application security profile (step 1325). In response to the evaluation of the rule 605, the appliance also processes a second check specified by the application security profile (step 1327).

Still referring to FIG. 13B, now in further detail, the method includes an appliance to identify a first policy to apply to a received packet stream; where the first policy 600 specifies a rule 605 that includes a first expression 610 and identifies an application security profile (step 1321). In some embodiments, the appliance 200 comprises a VPN proxy device. In some other embodiments, the appliance 200 identifies a first policy 600 to apply to a received TCP packet stream. The packet stream may be received in any manner and from any source. The packet stream may comprise any protocol or protocols.

The appliance 200 evaluates the rule of the policy (step 1323). The appliance may evaluate the rule according any to technique. In some embodiments, the rule may comprise an object-oriented expression. In other embodiments, the rule may comprise a plurality of object oriented expressions. In some embodiments, the appliance may determine a boolean value as a result of evaluating the expression.

In response to the evaluation of the rule 605, the appliance 200 processes a first check specified by the application security profile (step 1325). In some embodiments, the appliance may process the first check in response to determining that the rule is true.

The appliance may process the first check in any manner. In some embodiments, the appliance evaluates at least one setting of the first check to determine whether to apply the first check. In some other embodiments, the appliance determines that a URL contained in the packet stream matches at least one setting of the first check, and applies the first check in response to the determination. In still other embodiments, the appliance may determine that a URL contained in the packet stream matches an expression 610 of one setting of the first check, and applying the first check in response to the determination. In other embodiments, the appliance may determine that a URL contained in the packet stream matches an object-oriented expression 610 of one setting of the first check. The appliance may apply the first check in response to the determination.

Also in response to the evaluation of the rule 605, the appliance 200 may process a second check specified by the application security profile (step 1327). In some embodiments, the appliance may process the second check in response to determining that the rule is true. In some embodiments, the method uses at least one of the first check and second check in order to perform one of: SQL injection detection, invalid starting URL detection, cookie tampering detection, form field consistency detection, buffer overflow detection, cross-site scripting detection, credit card number detection, and invalid URL detection. In some other embodiments, the method uses at least one of the first check and second check to perform one of: SQL injection blocking, invalid starting URL blocking, cookie tampering blocking, inconsistent form field blocking, buffer overflow blocking, cross-site scripting blocking, credit card number blocking, and invalid URL blocking.

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method of configuring a network device to specify flow control among policies used in processing a packet stream, the method comprising:
   (a) providing a configuration interface for configuring a plurality of policies of a network device, at least one policy of the plurality of policies comprising a policy identifier; and
   (b) receiving, via the configuration interface, information identifying a first policy of the plurality of policies, the first policy identifying (i) a rule comprising a first expression and (ii) a first action to be taken based on an evaluation of the rule; and
   (c) receiving, via the configuration interface, information identifying a second policy of the plurality of policies to apply subsequent to the first policy if the rule evaluates to true.

2. The method of claim 1, wherein step (a) comprises providing a command-line configuration interface.

3. The method of claim 1, wherein step (a) comprises providing a configuration interface comprising one or more of a drag-and-drop interface, a list-selection interface, or a syntax-highlighting interface.

4. The method of claim 1, wherein step (a) comprises executing the configuration interface on a device in communication with the network device.

5. The method of claim 1, wherein step (a) comprises executing the configuration interface on the network device.

6. The method of claim 1, wherein the first expression is an object-oriented expression.

7. The method of claim 1, wherein the first action comprises no action.

8. The method of claim 1, wherein the first action specifies a function performing one of: load balancing, content switching, application security, application delivery, network acceleration, or application acceleration.

9. The method of claim 1, wherein step (c) comprises receiving an integer specifying a line number of a second policy.

10. The method of claim 1, wherein step (c) comprises receiving an policy identifier specifying a second policy.

11. The method of claim 1, wherein step (c) comprises receiving an expression to be evaluated at runtime to specify a line number of a second policy.

12. The method of claim 1, wherein step (c) comprises receiving an object-oriented expression to be evaluated at runtime to specify a line number of a second policy.

13. The method of claim 1, wherein the plurality of policies comprises a policy bank.

14. The method of claim 1, wherein each policy of the plurality of policies comprises a ranking indicating a default order in which the policies will be processed by a network device.

15. A method of flow control among policies used in a network device processing a packet stream, the method comprising:
   (a) identifying, by an appliance, a plurality of policies to apply to a received packet stream, at least one policy of the plurality of policies comprising a policy identifier;
   (b) processing, by the appliance, a first policy of the plurality of policies, the first policy identifying (i) a rule comprising a first expression and (ii) a first action to be taken based on an evaluation of the rule, and (iii) a second policy of the plurality of policies;
   (c) determining, by the appliance based on an evaluation of the expression, the rule evaluates to true; and
   (d) processing, by the appliance in response to the determination, the identified second policy.

16. The method of claim 15, wherein step (c) comprises evaluating an object-oriented expression.

17. The method of claim 15, further comprising the step of performing, in response to the determination, an action identified by the first policy.

18. The method of claim 15, further comprising the step of executing, in response to the determination, an action identified by the first policy; the action comprising performing one of: load balancing, content switching, application security, application delivery, network acceleration, or application acceleration.

19. The method of claim 15, wherein the first policy comprises an integer specifying a ranking of a second policy of the plurality of policies to be processed next if the first action applies.

20. The method of claim 15, wherein step (d) comprises evaluating, by the appliance, an expression to determine a ranking of a second policy of the plurality of policies to be processed next.

21. The method of claim 15, wherein step (d) comprises evaluating, by the appliance, an object oriented expression to determine a ranking of a second policy of the plurality of policies to be processed next.

22. The method of claim 15, wherein the plurality of policies comprises a policy bank.

23. The method of claim 15, wherein each policy of the plurality of policies comprises a ranking indicating a default order in which the policies should be processed.

24. The method of claim 15, further comprising storing in a list, in response to the determination, an action identified by the first policy.

25. The method of claim 24, further comprising storing, in the list, at least one other action, the at least one other action identified in at least one other policy having a rule evaluated to true.

26. The method of claim 25 further comprising performing each action stored in the list of actions.

27. An appliance providing flow control among policies used in a network device processing a packet stream, the appliance comprising:
   a packet processor which receives a packet stream; and
   a policy engine which identifies a plurality of policies to apply to a received packet stream, at least one policy of the plurality of policies comprising a policy identifier; processes a first policy of the plurality of policies, the first policy identifying (i) a rule comprising a first expression and (ii) a first action to be taken based on an evaluation of the rule, and (iii) a second policy of the plurality of policies; determines, based on an evaluation of the expression, the rule evaluates to true; and processes, by the appliance in response to the determination, the identified second policy.

28. The system of claim 27, wherein the policy engine evaluates an object-oriented expression.

29. The system of claim 27, wherein the policy engine performs, in response to the determination, an action identified by the first policy.

30. The system of claim 27, wherein the policy engine performs, in response to the determination, an action identified by the first policy; the action comprising performing one of: load balancing, content switching, application security, application delivery, network acceleration, or application acceleration.

31. The system of claim 27, wherein the first policy comprises an integer specifying a ranking of a second policy of the plurality of policies to be processed next if the first action applies.

32. The system of claim 27, wherein the policy engine evaluates an expression to determine a ranking of a second policy of the plurality of policies to be processed next.

33. The system of claim 27, wherein the policy engine evaluates an object oriented expression to determine a ranking of a second policy of the plurality of policies to be processed next.

34. The system of claim 27, wherein the plurality of policies comprises a policy bank.

35. The system of claim 27, wherein each policy of the plurality of policies comprises a ranking indicating a default order in which the policies should be processed.

36. The system of claim 27, wherein the policy engine stores in a list, in response to the determination, an action identified by the first policy.

37. The system of claim 36, wherein the policy engine stores, in the list, at least one other action, the at least one other action identified in at least one other policy having a rule evaluated to true.

38. The system of claim 37, wherein the policy engine performs each action stored in the list of actions.

* * * * *